(12) United States Patent
Juhasz

(10) Patent No.: US 11,337,474 B2
(45) Date of Patent: May 24, 2022

(54) INTERACTIVE SKIN FOR VEHICLE

(71) Applicant: Paul R. Juhasz, Houston, TX (US)

(72) Inventor: Paul R. Juhasz, Houston, TX (US)

(73) Assignee: INTERACTIVE SKIN, INC., Houston, TX (US)

( * ) Notice: Subject to any disclaimer, the term of this patent is extended or adjusted under 35 U.S.C. 154(b) by 468 days.

(21) Appl. No.: 15/955,544

(22) Filed: Apr. 17, 2018

(65) Prior Publication Data

US 2018/0297540 A1   Oct. 18, 2018

Related U.S. Application Data

(60) Provisional application No. 62/492,759, filed on May 1, 2017, provisional application No. 62/489,330, filed
(Continued)

(51) Int. Cl.
*G06F 3/0488* (2022.01)
*A41D 27/08* (2006.01)
(Continued)

(52) U.S. Cl.
CPC .............. *A41D 27/085* (2013.01); *A41B 1/08* (2013.01); *A41D 1/06* (2013.01); *A41D 3/02* (2013.01); *A43B 3/34* (2022.01); *A43B 3/36* (2022.01); *A43B 3/50* (2022.01); *A43B 23/022* (2013.01); *A45C 3/001* (2013.01); *A45C 3/06* (2013.01); *A45C 11/00* (2013.01); *B60Q 1/0023* (2013.01); *B60Q 1/0088* (2013.01); *B60R 13/02* (2013.01); *B60R 16/02* (2013.01); *G06F 3/0443* (2019.05);
(Continued)

(58) Field of Classification Search
CPC ................... G06F 3/044; G06F 3/0416; G06F 2203/04102; G06F 3/0443; G06F 3/0488; G06F 3/04883; A41D 1/022; G09G 2380/10; G09G 3/035; G09G 3/03; G09G 3/00
See application file for complete search history.

(56) References Cited

U.S. PATENT DOCUMENTS 7,248,151 B2 *  7/2007  McCall ............... B60R 25/2045
                                                       340/425.5
9,229,623 B1 *  1/2016  Penilla ................. G06F 3/0362
(Continued)

OTHER PUBLICATIONS

Organic Interactive Skin, Frederik Kreuzer, in Material District, Rotterdam, publ. Feb. 15, 2016 (2 pages).
(Continued)

*Primary Examiner* — Antonio Xavier
(74) *Attorney, Agent, or Firm* — The Juhasz Law Firm

(57) ABSTRACT

A panel of a vehicle may be provided with or configured to provide interactive skin. The interactive skin may be configured for accepting touch input from a user. The interactive skin may include one or more flexible layers and may include or be mounted under a transparent display cover layer such as a layer of clear glass or plastic. Interactive skin may include a touch-sensitive layer that allows a user to provide touch input to the panel of the vehicle. Display pixels on interactive skin may be used to display visual information to the user. The interactive skin may be configured for detecting a condition of at least one panel and generating an output function in response to the detected condition.

39 Claims, 14 Drawing Sheets

Related U.S. Application Data on Apr. 24, 2017, provisional application No. 62/486,331, filed on Apr. 17, 2017.

(51) Int. Cl.

| | | |
|---|---|---|
| *A41D 1/06* | (2006.01) | |
| *A41B 1/08* | (2006.01) | |
| *A41D 3/02* | (2006.01) | |
| *A45C 3/06* | (2006.01) | |
| *A45C 3/00* | (2006.01) | |
| *A45C 11/00* | (2006.01) | |
| *A43B 23/02* | (2006.01) | |
| *G06F 3/044* | (2006.01) | |
| *A43B 3/34* | (2022.01) | |
| *A43B 3/36* | (2022.01) | |
| *A43B 3/50* | (2022.01) | |
| *B60Q 1/00* | (2006.01) | |
| *B60R 13/02* | (2006.01) | |
| *B60R 16/02* | (2006.01) | |
| *A41D 1/00* | (2018.01) | |
| *G06F 3/04883* | (2022.01) | |
| *A41D 1/04* | (2006.01) | |
| *A41D 1/02* | (2006.01) | |
| *A41D 1/22* | (2018.01) | |
| *A44C 15/00* | (2006.01) | |
| *A44C 25/00* | (2006.01) | |
| *B60R 99/00* | (2009.01) | |

(52) U.S. Cl.
CPC ............ *G06F 3/0488* (2013.01); *A41D 1/002* (2013.01); *A41D 1/02* (2013.01); *A41D 1/04* (2013.01); *A41D 1/22* (2013.01); *A44C 15/005* (2013.01); *A44C 15/0015* (2013.01); *A44C 25/001* (2013.01); *A45C 2011/002* (2013.01); *B60R 99/00* (2013.01); *G06F 3/04883* (2013.01); *G06F 2203/04102* (2013.01)

(56) References Cited

U.S. PATENT DOCUMENTS

| | | | |
|---|---|---|---|
| 9,272,708 B2 | 3/2016 | Cuddihy et al. | |
| 9,918,534 B2 | 3/2018 | Saila et al. | |
| 9,958,870 B1* | 5/2018 | Graybill | G05D 1/02 |
| 10,080,950 B2* | 9/2018 | Kelley | G06F 1/1652 |
| 10,082,830 B2 | 9/2018 | Lettow | |
| 10,379,576 B1 | 8/2019 | Lettow | |
| 10,589,716 B2* | 3/2020 | Sobecki | B60Q 1/0023 |
| 10,802,575 B2* | 10/2020 | Schlecht | G06F 3/167 |
| 2003/0222857 A1* | 12/2003 | Abileah | G06F 3/0488 345/173 |
| 2008/0211652 A1 | 9/2008 | Cope et al. | |
| 2010/0179725 A1* | 7/2010 | Boote | B32B 17/10541 701/36 |
| 2010/0214253 A1* | 8/2010 | Wu | G06F 3/044 345/174 |
| 2011/0069050 A1* | 3/2011 | Sirmon | H05K 1/142 345/207 |
| 2011/0210942 A1* | 9/2011 | Kitamori | G06F 3/04186 345/174 |
| 2012/0078999 A1* | 3/2012 | Andrew | G06F 3/014 709/203 |
| 2012/0204307 A1 | 8/2012 | De Mattei et al. | |
| 2012/0268665 A1 | 10/2012 | Yetukuri et al. | |
| 2012/0319992 A1* | 12/2012 | Lee | G06F 3/044 345/174 |
| 2013/0076649 A1* | 3/2013 | Myers | G06F 3/0485 345/173 |
| 2013/0278524 A1* | 10/2013 | Wang | G06F 3/0416 345/173 |
| 2013/0332874 A1* | 12/2013 | Rosinko | G06F 3/0484 715/771 |
| 2014/0015637 A1* | 1/2014 | Dassanayake | G07C 9/00174 340/5.54 |
| 2014/0043288 A1* | 2/2014 | Kurasawa | G02F 1/13338 345/174 |
| 2014/0067202 A1* | 3/2014 | Odland | B60Q 1/26 701/36 |
| 2014/0111323 A1* | 4/2014 | Strout | B60Q 1/268 340/425.5 |
| 2014/0204035 A1* | 7/2014 | Chang | G06F 3/0416 345/173 |
| 2014/0318699 A1 | 10/2014 | Longinotti-Buitoni et al. | |
| 2014/0373395 A1* | 12/2014 | White | A43B 3/0078 36/137 |
| 2015/0062022 A1* | 3/2015 | Rabii | G06T 1/20 345/173 |
| 2015/0077272 A1* | 3/2015 | Pisz | B60K 35/00 340/905 |
| 2015/0083615 A1* | 3/2015 | Lay | F16M 11/105 206/45.24 |
| 2015/0194082 A1* | 7/2015 | McEwan | B60Q 1/444 40/209 |
| 2015/0253930 A1* | 9/2015 | Kozloski | H04N 21/4725 345/175 |
| 2015/0346866 A1* | 12/2015 | Kusunoki | G06F 3/0412 345/174 |
| 2016/0041581 A1* | 2/2016 | Piccionelli | G02F 1/133305 345/156 |
| 2016/0188069 A1* | 6/2016 | Tao | G06F 3/0414 345/173 |
| 2016/0283101 A1* | 9/2016 | Schwesig | D03D 1/0088 |
| 2016/0327979 A1* | 11/2016 | Lettow | B60N 2/56 |
| 2016/0328043 A1* | 11/2016 | Moller | G06F 3/0416 |
| 2016/0363991 A1 | 12/2016 | Schlecht et al. | |
| 2017/0027514 A1* | 2/2017 | Biederman | A61B 5/1451 |
| 2017/0052749 A1* | 2/2017 | Lee | A41D 1/00 |
| 2017/0090599 A1* | 3/2017 | Kuboyama | G06F 3/038 |
| 2017/0365210 A1* | 12/2017 | Wang | A41D 1/002 |
| 2017/0369067 A1* | 12/2017 | Saigusa | B60W 30/18163 |
| 2018/0072218 A1 | 3/2018 | Sweeney et al. | |
| 2018/0136902 A1* | 5/2018 | Feit | G06F 3/167 |
| 2018/0149777 A1* | 5/2018 | Brown | G02B 5/0278 |
| 2018/0310360 A1 | 10/2018 | Lettow | |
| 2019/0030411 A1* | 1/2019 | Yang | A63B 69/02 |
| 2019/0285878 A1* | 9/2019 | Hansen | G09F 13/04 |
| 2020/0033644 A1* | 1/2020 | Bhaskaran | G02B 6/0053 |
| 2020/0139814 A1* | 5/2020 | Galan Garcia | B60K 35/00 |

OTHER PUBLICATIONS

Office Action, U.S. Appl. No. 15/955,487, dated Feb. 19, 2020, 42 pages.

* cited by examiner

INTERACTIVE SKIN FOR VEHICLE

RELATED APPLICATIONS

This application claims priority to provisional Application Ser. No. 62/486,331 filed Apr. 17, 2017; provisional Application Ser. No. 62/489,330 filed Apr. 24, 2017; and provisional Application Ser. No. 62/492,759 filed May 1, 2017; all three provisional applications being hereby incorporated by reference. Applicants cross-reference the following applications for information on Applicants' work with interactive skins: Interactive Skin for Wearable, Ser. No. 15/955,487 filed Apr. 17, 2018; and Interactive Skin, Ser. No. 16/387,394 filed Apr. 17, 2019.

BACKGROUND OF THE INVENTION

Field of the Invention

The present invention relates generally to vehicles, and more particularly, to panels of a vehicle with interactive skin.

Description of the Related Art

The panels of a vehicle—exterior or interior—may be made of different types of materials, and each one is chosen for a different purpose. Important design criteria for panels may include location on the vehicle, lightweight, economic effectiveness, safety, recyclability, life cycle considerations, environmentally friendly, and appearance.

Consumer demand for more luxurious interiors and more modern exteriors may also influence the types of panels found in vehicles.

There is a need for improved vehicle panels.

SUMMARY OF THE INVENTION

A panel of a vehicle may be provided with or configured to provide an interactive skin. The interactive skin may be configured for accepting touch input from a user. The interactive skin may illustratively include one or more flexible layers and may include or be mounted under a transparent display cover layer such as a layer of clear glass or plastic. The interactive skin may include a touch-sensitive layer that allows a user to provide touch input to the panel of the vehicle. Display pixels on interactive skin may be used to display visual information to the user.

The interactive skin may be configured for detecting a condition of at least one panel and generating an output function in response to the detected condition. The condition may be detected by a sensor. The interactive skin may be configured with display pixels used to display visual information to the user on the detected condition. The interactive skin may be configured with a touch-sensitive layer that allows a user to provide touch input to the interactive skin to cause the interactive skin to check on the condition of one or more vehicle panels or of a condition of a vehicle or to respond to visual information provided to the user on the detected condition.

The interactive skin may be used to support vehicle systems, infotainment, safety, communication connectivity within and without the vehicle, and so on. The interactive skin may be used for displaying information and visual feedback to a user and for accepting input from a user.

Active portions of the interactive skin may be used to create virtual user interface controls such as buttons. During use, the buttons or other user input interface elements may be reconfigured. For instance, the user input interface elements may be repurposed for supporting user input operations in different operating modes of the interactive skin. Virtual buttons may be provided. They may be provided additional to or in place of tactile input/output components such as physical buttons and switches.

In operation, a virtual button may be a virtual volume button. The virtual button may control audio output volume. The virtual button may be repurposed based on user input. For example, the virtual button may be repurposed to become a virtual camera shutter button for taking a picture. As another example, the virtual button may be reconfigured to serve as a controller for another device function. Images displayed on the interactive skin may indicate to a user which function is currently being performed by the virtual button. Predetermined inputs to the touch-sensitive layer such as tapping, sliding, swiping, or other motions of an external object such as a finger across the interactive skin may be used to change the operating mode of the interactive skin.

BRIEF DESCRIPTION OF THE DRAWINGS

FIGS. 1A, 1B, 1C, 1D, 1E, 1F, and 1G collectively referred to herein as FIG. 1.

FIGS. 2A and 2B, collectively referred to herein as FIG. 2.

FIGS. 4A and 4B, collectively referred to herein as FIG. 4.

FIGS. 5A and 5B, collectively referred to herein as FIG. 5.

FIGS. 7A and 7B, collectively referred to herein as FIG. 7.

DETAILED DESCRIPTION OF THE INVENTION

Figure 1A:
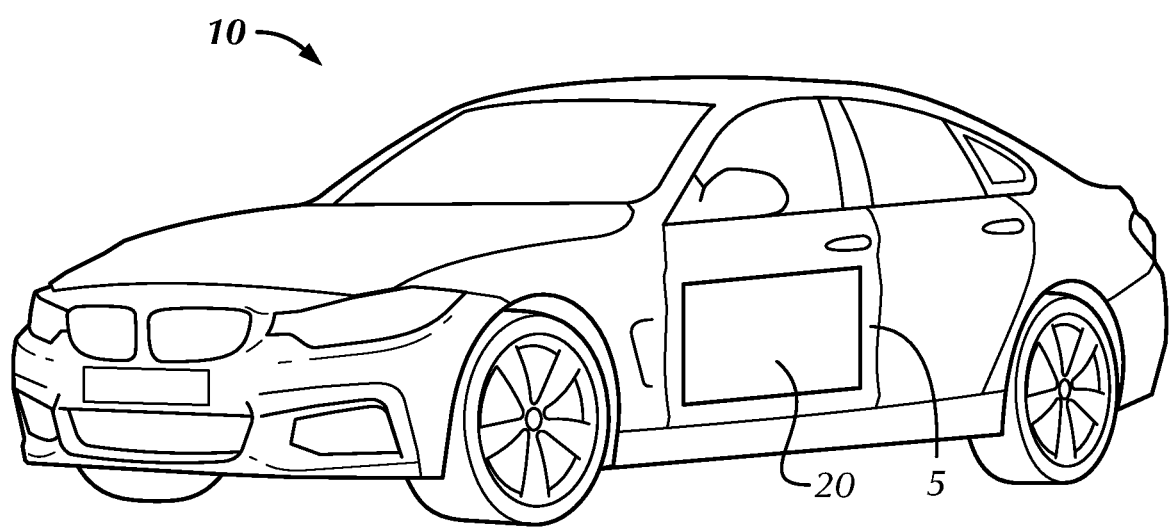
FIG. 1A shows aspects of an illustrative vehicle panel configured as or with an interactive skin in accordance with an embodiment of the present disclosure.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

A panel of a vehicle may be provided with or configured to provide an interactive skin. The interactive skin may be configured for accepting touch input from a user. The interactive skin may illustratively include one or more flexible layers and may include or be mounted under a transparent display cover layer such as a layer of clear glass or plastic. The transparent layer may be configured to hermetically seal, environmentally protect, and so on, the flexible layers lying under the transparent layer. The interactive skin may include a touch-sensitive layer that allows a user to provide touch input to the panel of the vehicle. Display pixels on interactive skin may be used to display visual information to the user.

Interactive skins may be configured for detecting a condition of at least one panel and generating an output function in response to the detected condition. The condition may be detected by a sensor. Interactive skins may be configured with display pixels used to display visual information to the user on the detected condition. Interactive skins may be configured with a touch-sensitive layer that allows a user to provide touch input to the interactive skin to cause the interactive skin to check on the condition of one or more vehicle panels or of a condition of a vehicle or to respond to visual information provided to the user on the detected condition.

The interactive skin may be used to support vehicle systems, infotainment, safety, communication connectivity within and without the vehicle, and so on. The interactive skin may be used for displaying information and visual feedback to a user and for accepting input from a user.

Active portions of the interactive skin may be used to create virtual user interface controls such as buttons. During use, the buttons or other user input interface elements may be reconfigured. For instance, the user input interface elements may be repurposed for supporting user input operations in different operating modes of the interactive skin. Virtual buttons may be provided. They may be provided additional to or in place of tactile input/output components such as physical buttons and switches.

In operation, a virtual button may be a virtual volume button. The virtual button may control audio output volume. The virtual button may be repurposed based on user input. For example, the virtual button may be repurposed to become a virtual camera shutter button for taking a picture. As another example, the virtual button may be reconfigured to serve as a controller for another device function. Images displayed on the interactive skin may indicate to a user which function is currently being performed by the virtual button. Predetermined inputs to the touch-sensitive layer such as tapping, sliding, swiping, or other motions of an external object such as a finger across the interactive skin may be used to change the operating mode of the interactive skin.

FIG. 1A depicts an illustrative vehicle 10 that may be provided with an interactive skin 20 of this disclosure. Vehicle 10 may illustratively be a car. Alternatively, vehicle 10 may be a bus, a truck, a plane, a train, a motorcycle, a bicycle, a motor or sail or other boat, a ski or snowboard, or any other mode of transportation.

As shown in FIG. 1, a panel may be any internal or external panel of a vehicle. The panels may be formed of plastic, glass, ceramics, fiber composites, metal (e.g., stainless steel, aluminum, etc.), other suitable materials, or a combination of these materials.

FIG. 1A depicts an external panel of the vehicle in the form factor of door 5 for use with this disclosure.

Figure 1B:
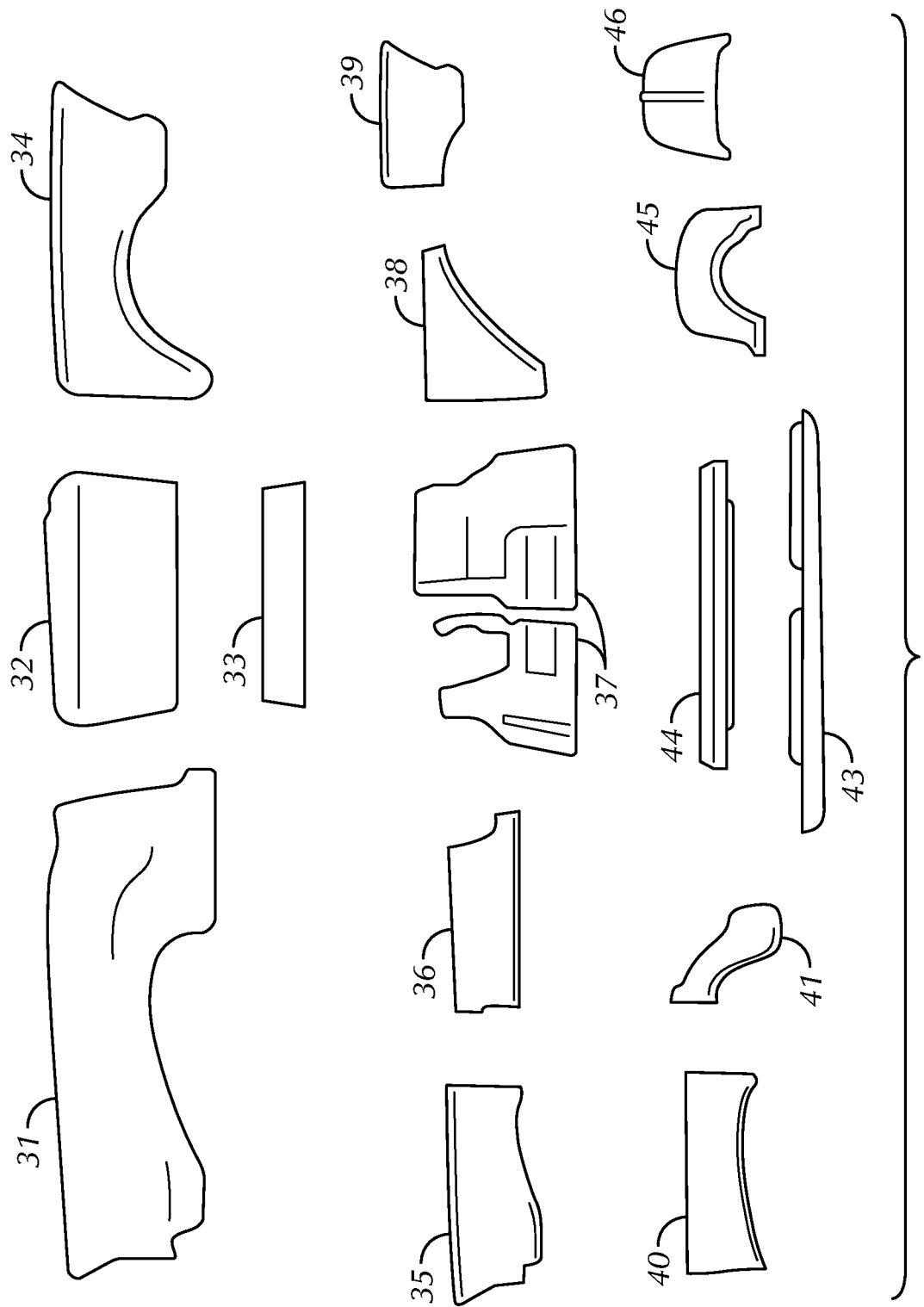
FIG. 1B and FIG. 1C show illustrative external panels of an illustrative vehicle that may be adapted with the interactive skin of this disclosure.

FIG. 1B depicts illustrative external panels of a vehicle for use with this disclosure including a full rear fender panel 31, a door 32, a door bottom 33, a full front fender panel 34, a rear fender panel 35, a lower front section of rear fender 36, a floor pan 37, a rear section of front fender 38, a front section of front fender 39, a wheel arch or center section of rear fender 40, a dogleg panel 41, a rocker panel 2 door 44, a rocker panel 4 door 43, an inner headlight panel 45, a headlight cap 46.

Figure 1C:
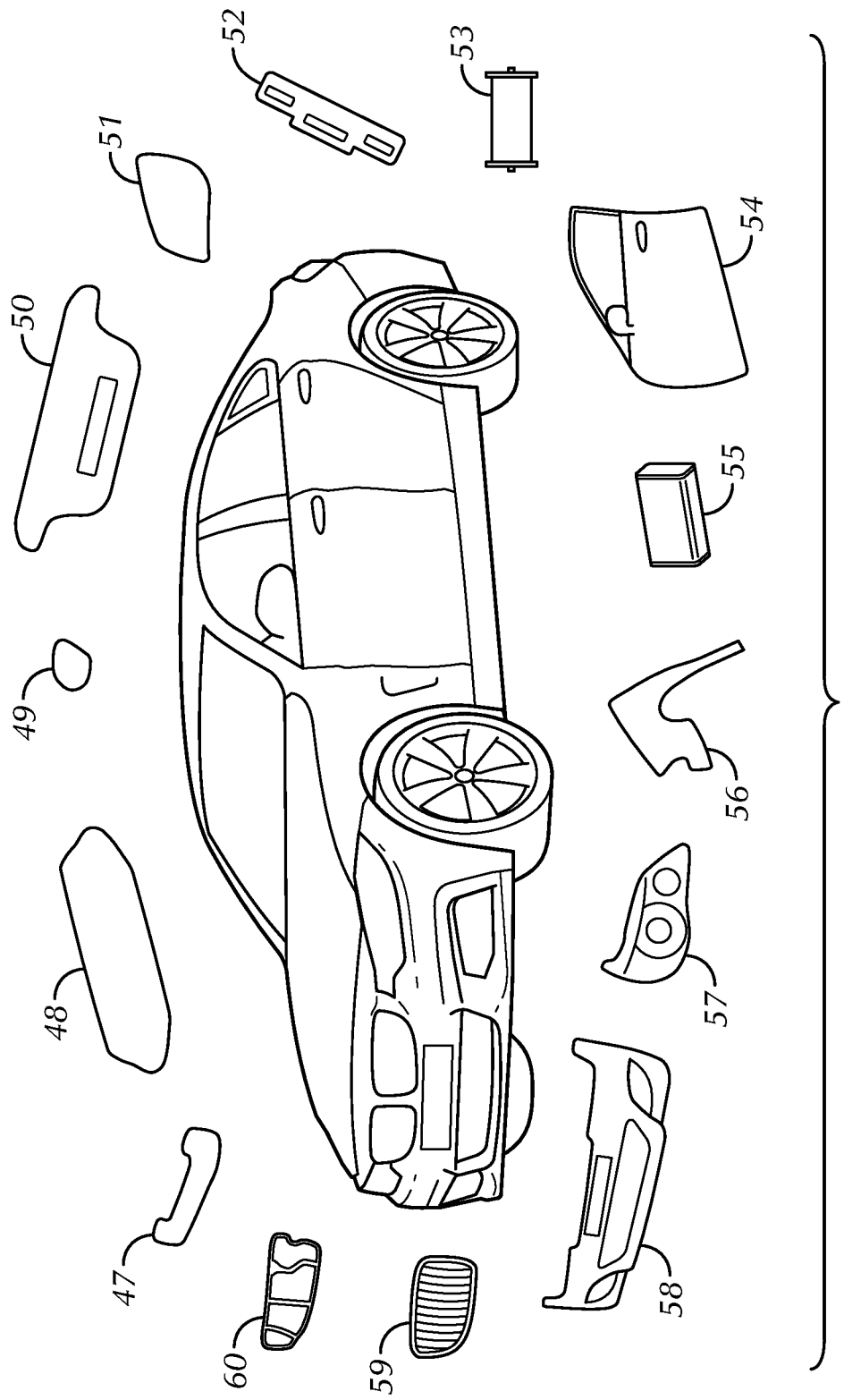

FIG. 1C depicts illustrative external panels of a vehicle including header and nose panels 47, hoods 48, mirrors 49, tailgates trunk lids 50, tail lights 51, step bumpers 52, A/C condensers 53, doors 54, radiators 55, fenders 56, headlights 57, bumpers 58, grills 59, radiator supports 60.

Figure 1D:
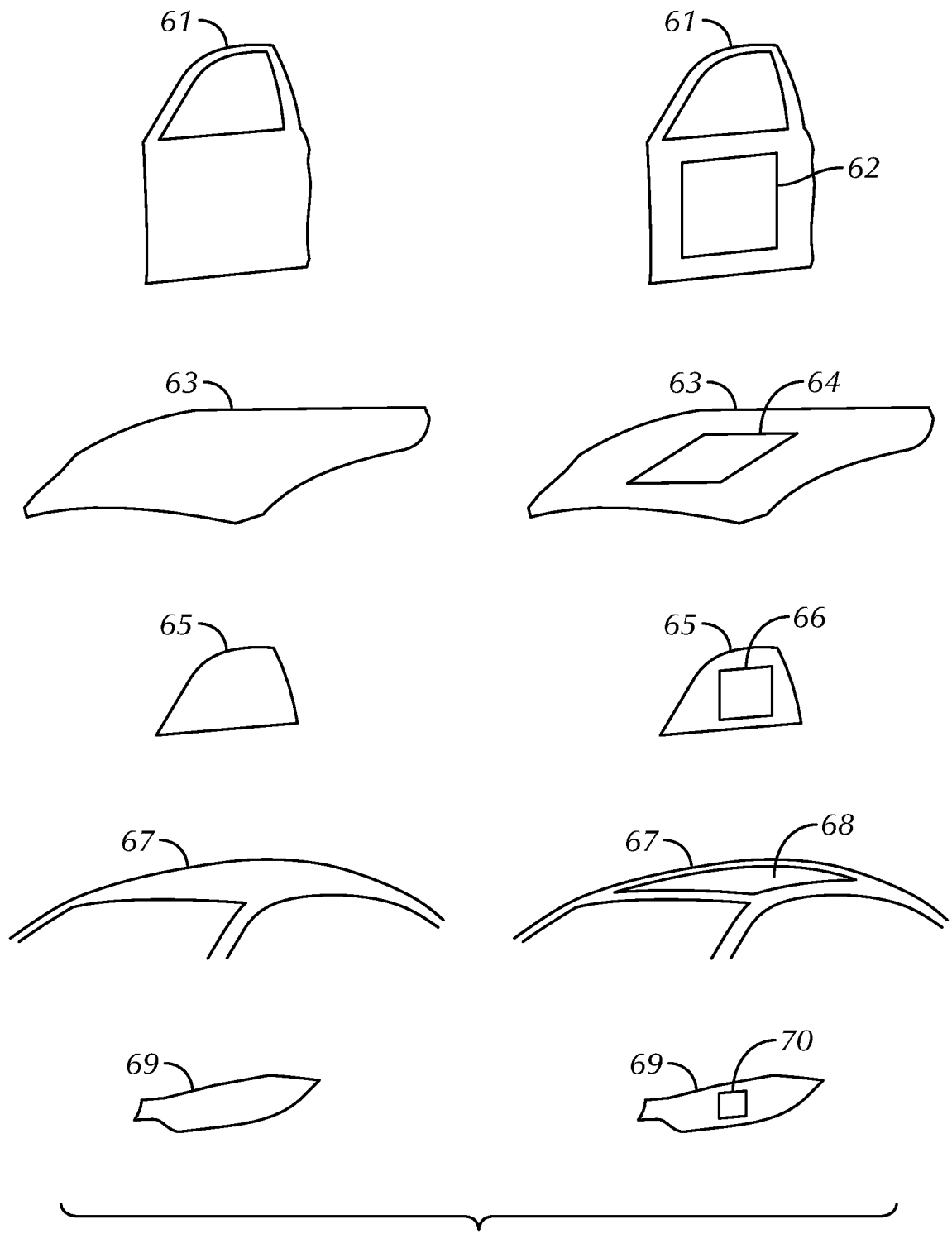
FIG. 1D shows illustrative external panels alone and adapted with the interactive skin of this disclosure.

FIG. 1D depicts illustrative external panels of a vehicle for use with this disclosure including illustrative door panel 61, engine hood panel 63, window 65, roof 67, and headlight 69.

Figure 1E:
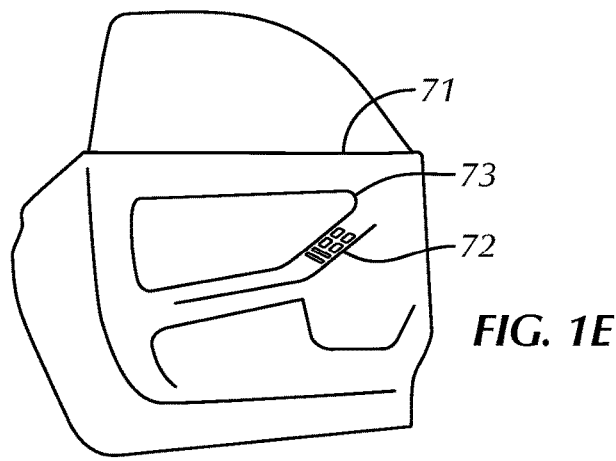
FIGS. 1E, IG. 1F, and 1G show illustrative internal panels of an illustrative vehicle adapted with the interactive skin of this disclosure.

FIG. 1E depicts illustrative internal panels of a vehicle for use with this disclosure including inner door panel 71 and arm rest 72.

Figure 1F:
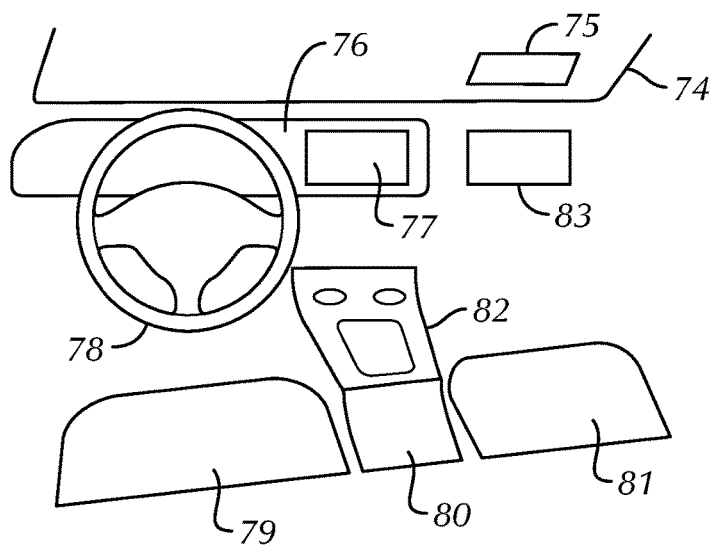

FIG. 1F depicts illustrative internal panels of a vehicle for use with this disclosure including window 74, dashboard 77, steering wheel 78, seats 79, 81, console 82.

Figure 1G:
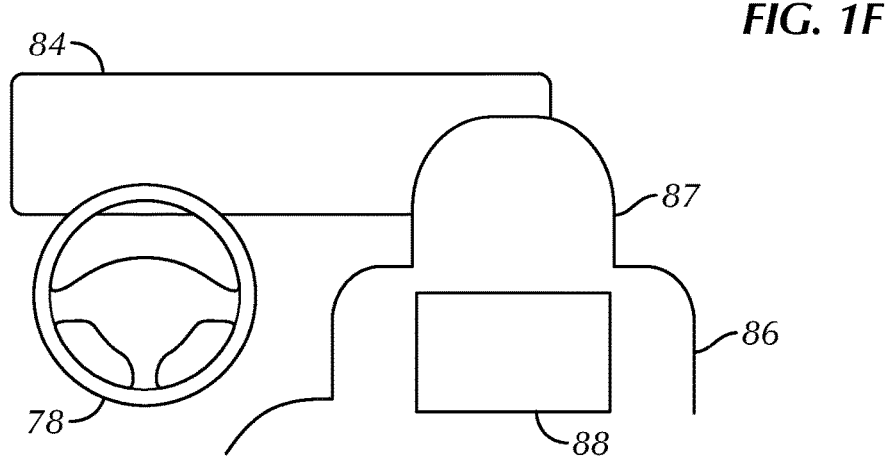

FIG. 1G depicts illustrative internal panels of a vehicle for use with this disclosure including window 84, steering wheel 85, seat 86, headrest 87.

As shown in FIG. 1A, panel 5 of vehicle 10 may be adapted with an interactive skin 20 of this disclosure. Specifically, the external panel of the vehicle in the form factor of door 5 is provided with an interactive skin 20 of this disclosure.

In the illustrative embodiments depicted in FIG. 1D, the external panels of the vehicle in the form factor of: the door 62 may be provided with an interactive skin 62 of this disclosure, the engine hood 63 may be provided with an interactive skin 64 of this disclosure, the window 65 may be provided with an interactive skin 66 of this disclosure, the roof 67 may be provided with an interactive skin 68 of this disclosure, the headlight 69 may be provided with an interactive skin 70 of this disclosure.

In the illustrative embodiments depicted in FIG. 1E, the internal panels of the vehicle in the form factor of inner door panel 71 may be provided with an interactive skin 73 of this disclosure. Additionally or alternatively, the armrest 72 and window may also be provided with an interactive skin of this disclosure.

In the illustrative embodiments depicted in FIG. 1F, the internal panels of the vehicle in the form factor of: window 74 may be provided with an interactive skin 75 of this disclosure; dashboard 76 may be provided with an interactive skin 77 of this disclosure; console 82 may be provided with an interactive skin 80 of this disclosure. Additionally or alternatively, the steering wheel 78 and/or column may be provided with an interactive skin of this disclosure; and seats 79, 81 may be provided with an interactive skin of this disclosure.

In the illustrative embodiments depicted in FIG. 1G, the internal panels of the vehicle in the form factor of: seat 86 may be provided with an interactive skin 88 of this disclosure. Additionally or alternatively, the headrest 87, the window 84, the steering wheel 85 and/or the steering column may be provided with an interactive skin of this disclosure.

According to this disclosure that any internal or external panel of a vehicle may be provided with an interactive skin of this disclosure. The panels previously described are illustrative. As further explained in connection with FIG. 7, the panel may be any part of a vehicle.

Figure 2A:
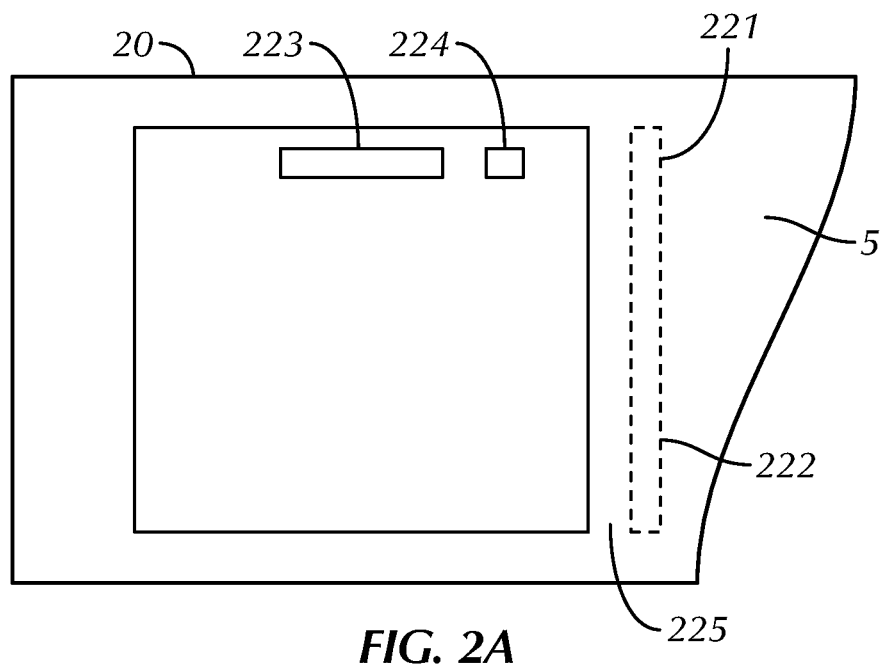
FIGS. 2A, 2B depict some illustrative vehicle panels with which an interactive skin of this disclosure may be used.

FIG. 2 shows the external panel of a vehicle in the form factor of door 5 shown in FIG. 1A adapted with the interactive skin 20 in two illustrative configurations. In FIG. 2A, interactive skin 20 is depicted as in FIG. 1A. As shown in FIG. 2A, interactive skin 20 may overlay or be received within or form an integrated part of a portion of the external panel of the vehicle in the form factor of door 5.

Figure 2B:
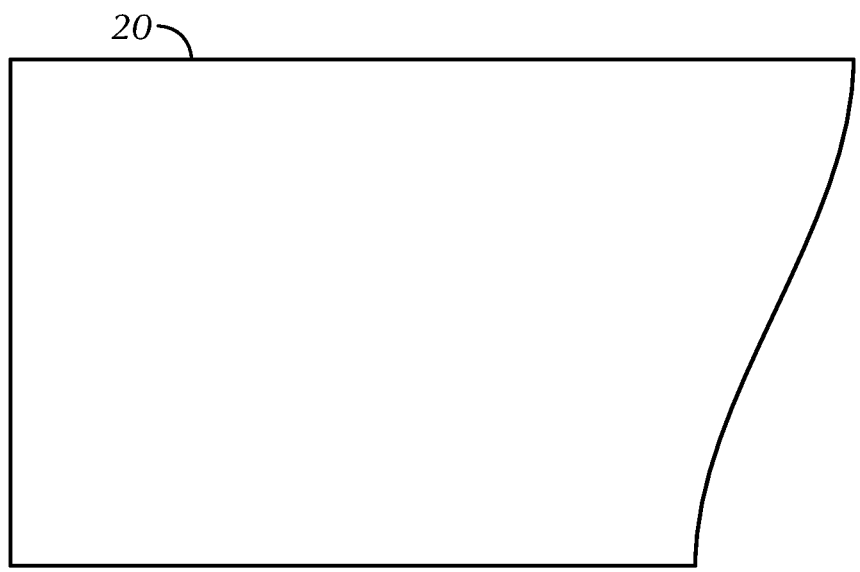

In an alternative illustrative embodiment depicted in FIG. 2B, interactive skin 20 may overlay or be received within or form an integrated part of substantially all or all of the external panel of the vehicle in the form factor of door 5. In either embodiment, illustratively, interactive skin 20 may be bent to contour the panel of the vehicle. Alternatively, interactive skin 20 may be configured to provide the panel of the vehicle with a predetermined contour.

Interactive skin of this disclosure has been illustratively depicted in this disclosure as interactive skin 20 depicted in FIG. 1A, interactive skins 62, 64, 66, 68, and 70 depicted in FIG. 1D, interactive skins 73, 75, 77, 80, 83, and 88 depicted in FIGS. 1E, 1F, 1G.

Figure 3:
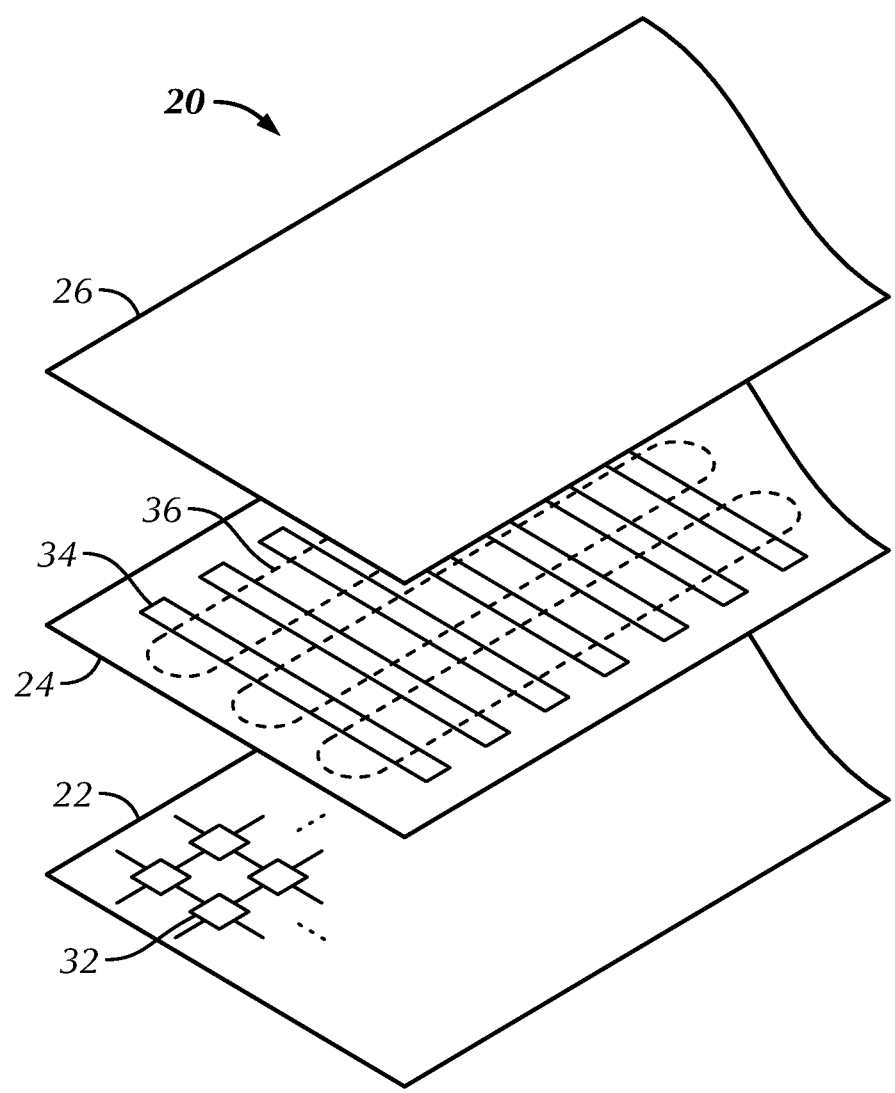
FIG. 3 depicts an illustrative interactive skin in accordance with an embodiment of this disclosure.

As shown in FIG. 3, interactive skin 20 may be formed from multiple layers of material. The interactive skin 20 may be formed by stacking multiple layers.

In the illustrative embodiment, the interactive skin includes a flexible display layer 22, a touch sensitive layer 24, and a transparent display cover layer 26. The flexible display layer 22 may include a display pixel array 32 which may, for example, be an organic light-emitting diode (OLED) array. Other types of interactive skin pixel arrays may also be formed. For example, the image pixels may be formed from light-emitting diodes, plasma cells, electronic ink elements, liquid crystal display components, or other suitable image pixel structures compatible with the interactive skin. The flexible display layer may illustratively be formed using flexible sheets of polymer or other substrates having thicknesses of 10 microns to 0.5 mm or other suitable thicknesses.

The touch sensitive layer 24 may be a layer on which a pattern of indium tin oxide (ITO) electrodes or other suitable transparent electrodes have been deposited to form a capacitive touch sensor array. As depicted in FIG. 3, touch sensitive layer 24 may incorporate capacitive touch electrodes such as horizontal transparent electrodes 34 and vertical transparent electrodes 36. Touch sensitive layer may be configured to detect the location of one or more touches or near touches on touch sensitive later 24. Detection may be based on capacitive, resistive, optical, acoustic, inductive, or mechanical measurements, or any basis that can be measured with respect to the occurrence of one or more touches or near touches in proximity to the touch sensitive layer 24. The touch sensitive layer may illustratively be formed using flexible sheets of polymer or other substrates having thicknesses of 10 microns to 0.5 mm or other suitable thicknesses.

Software and/or hardware may be used to process the measurements to the detected touches to identify and track the one or more touches or near touches. A gesture may occur by moving one or more fingers or other objects in a particular manner on touch sensitive layer 24. Examples of gestures include tapping, pressing, and rocking. It may also include scrubbing, twisting, and changing orientation. It may include pressing with varying pressure and the like at essentially the same time, contiguously, or consecutively. A gesture may illustratively be characterized by a pinching, sliding, swiping, rotating, flexing, dragging, or tapping motion between or with any other finger or fingers. A single gesture may be performed in a variety of ways. For instance, with one or more hands, by one or more users, or any combination thereof.

In addition to flexible display layer 22 and touch sensitive layer 24, interactive skin 20 may include one or more structural layers. For example, interactive skin 20 may include the transparent display cover layer 26. In other words, flexible display layer 22 and touch sensitive layer 24 may be covered with a flexible or rigid cover layer. The transparent display cover layer 26 may be formed from a glass or plastic and may be flexible but alternatively may be rigid.

In addition, flexible display layer 22 and touch sensitive layer 24 may be mounted on a support structure. For example they may be mounted on a rigid support. Layers of adhesive may be used in attaching interactive skin layers to each other and may be used in mounting interactive skin layers to rigid and flexible structural layers. The structural layer may be the structural panel of the vehicle to which the interactive skin is attached.

Alternatively, interactive skin may be integrated with a material configured to provide more structure to the interactive skin. For instance, the interactive skin may be integrated into injection-molded plastics. In this embodiment, the integrated structure may provide both interactive skin and support structure.

Where the cover layer for interactive skin 20 is flexible, input-output components that rely on the presence of flexible layers may be mounted at any suitable location under the interactive skin. For example, they may be mounted along peripheral portions of the interactive skin, in a central portion of the interactive skin, and so on. For example, a speaker component may be mounted, for example, in the panel of the vehicle under the interactive skin.

Where the flexible layers are covered by a rigid cover glass layer or other rigid cover layer, one or more openings may be provided in the rigid layer and electronic components may be mounted for example, in the panel of the vehicle under the openings of the interactive skin.

Figure 6:
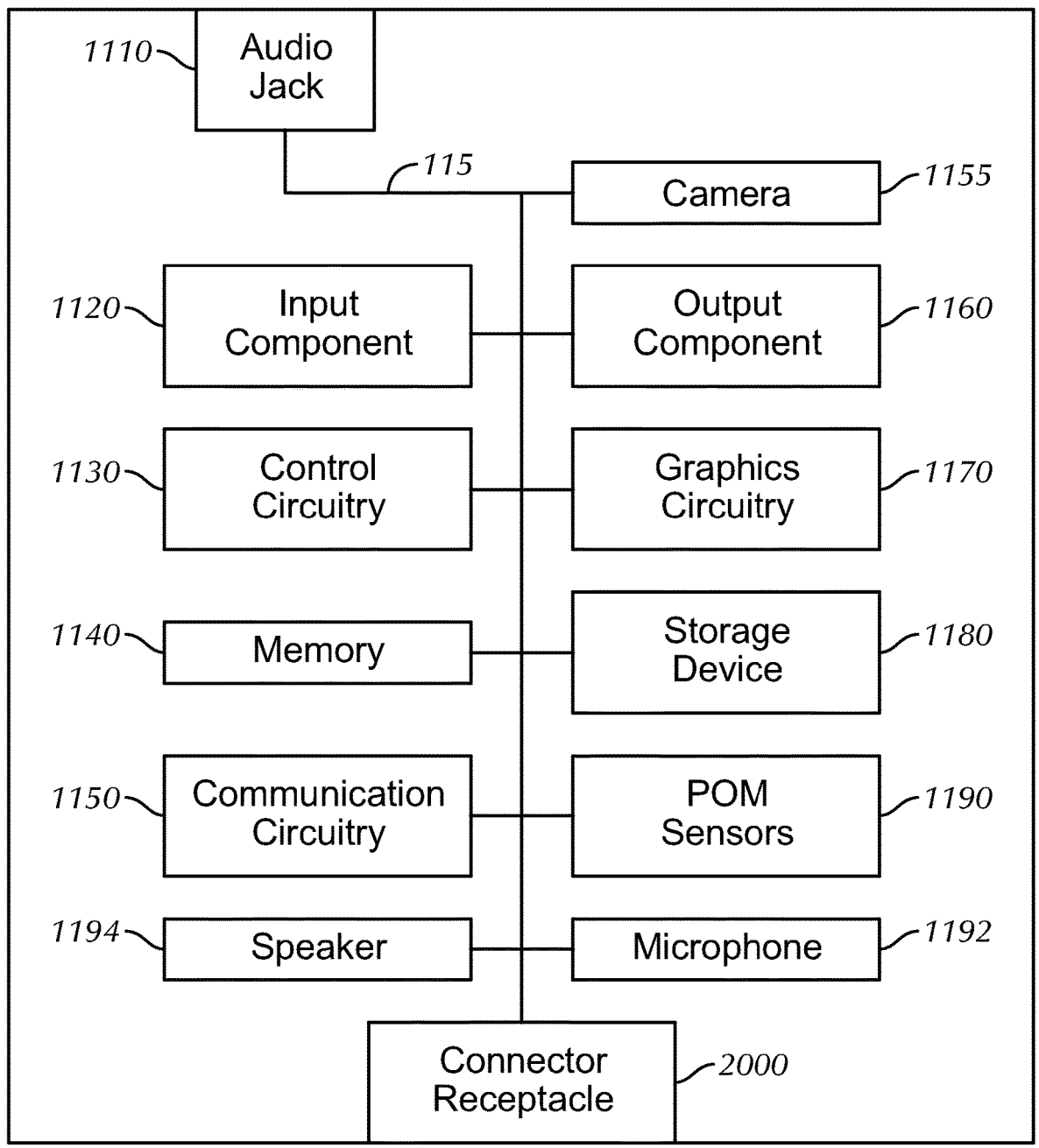
FIG. 6 depicts a block diagram of illustrative electronic components, circuitry, sensors, and connectors for use with the interactive skin of this disclosure.

The openings in interactive skin and/or panel may accommodate electronic components like volume, ringer, sleep, other buttons; openings for an audio jack, data port connectors, removable media slots; camera; sensors; microphone; speaker; and so on. With or without openings, FIG. 6 depicts illustrative electronic components that may be accommodated by interactive skin and/or panel.

FIG. 2A shows that interactive skin 20 may bend into and run under or inside the external panel 5 of the vehicle in the form factor of door. For example, interactive skin 20 is seen to extend along vehicle panel, bend into the panel 5, extend under portion 225 of panel 5 and a portion of interactive skin 222 may be visible through opening 221 of panel 5.

Illustratively, a portion 223 of interactive skin 222 may be configured to include virtual buttons, virtual switches, scrolling displays, and so on. Alternatively, these features may be provided in other portions of interactive skin. The openings that may be created in the panel of the vehicle may be round openings, rectilinear openings, oval shaped or oddly shaped openings, and so on.

Display portions of interactive skin 20 may be separated from other portions of interactive skin 20. This may illustratively be done by using a printed or painted mask on an internal surface of the cover layer. Alternatively, portions of the interactive skin may be separated by selectively activating and inactivating display pixels. This may create virtual borders, virtual sections, or other visual delineations between portions of interactive skin 20.

In some embodiments, portions of interactive skin 20 such as peripheral regions may be inactive. Other portions of interactive skin 20 such as a rectangular central portion may correspond to an active part of interactive skin 20. In the active region, an array of image pixels may be used to present text and images to a user of interactive skin 20. In the active region, interactive skin 20 may include touch sensitive components. These components may allow for input and interaction with a user of interactive skin 20. In an alternative embodiment, the active region may include sensors for detecting conditions as explained later in this disclosure.

In another illustrative embodiment, all or substantially all of the interactive skin 20 may be covered with display pixels. Edge portions of interactive skin 20 may contain portions of the array of image pixels for presenting to present text and images to a user of interactive skin 20. The edge portions may also include touch-sensitive components for input and interaction with a user of interactive skin 20.

Figure 4A:
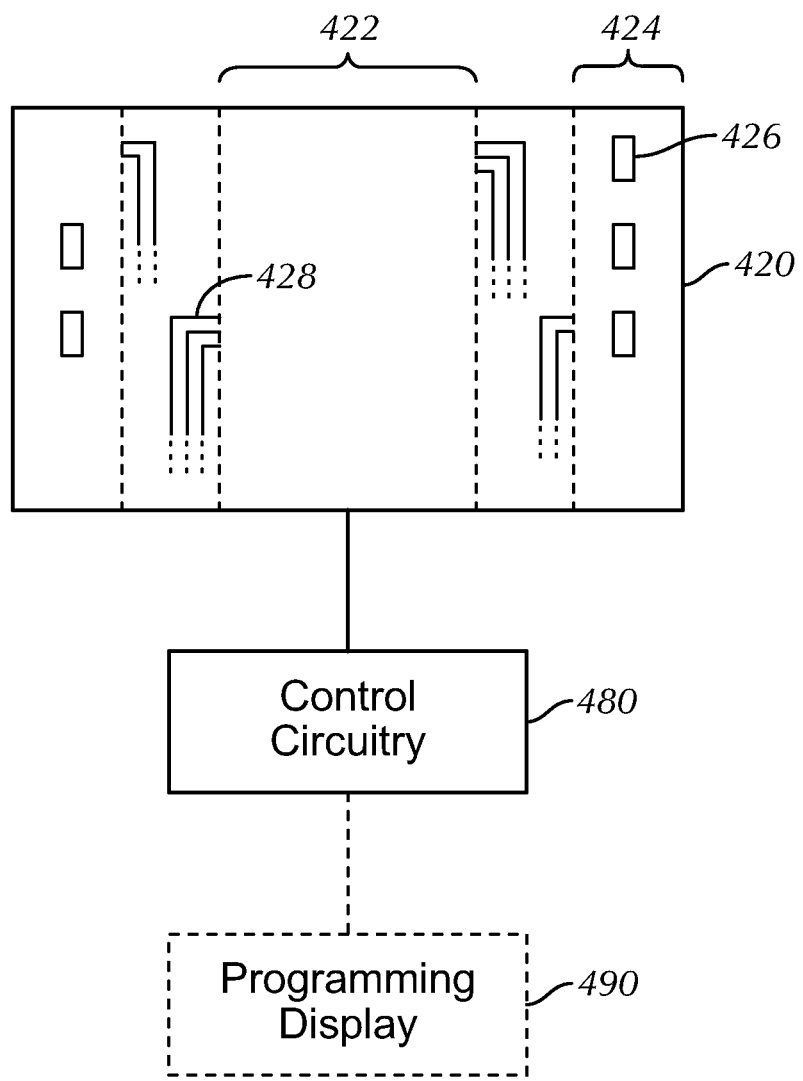
FIGS. 4A and 4B depict depicts illustrative control circuitry coupled to an interactive skin in accordance with an embodiment of this disclosure.

FIG. 4A shows how interactive skin 20 may be coupled to control circuitry such as control circuitry 480 associated with the interactive skin 20. The control circuitry may be dedicated to the interactive skin. Alternatively, a plurality of interactive skins according to this disclosure may have a dedicated controller. In another illustrative embodiment, a controller of a vehicle may be in electrical communication with the interactive skin and may control the functioning of the interactive skin.

In another embodiment, the controller may be a smart phone that is in electrical communication with the interactive skin of this disclosure. For instance, the interactive skin may include an electrical connector configured to electrically connect to a power data port of a smart phone. The electrical connector may be a computer bus and power connector such as Lightning created by Apple configured to enable the smart phone to provide power and control interactive skin of this disclosure according to this disclosure. The electrical connector interfaces to the control lines of the interactive skin disclosed herein to enable the processor of the smartphone to control the interactive skin. In another illustrative embodiment, the smart phone communicates to communication circuitry associated with interactive skin according to the teachings of this disclosure.

Figure 4B:
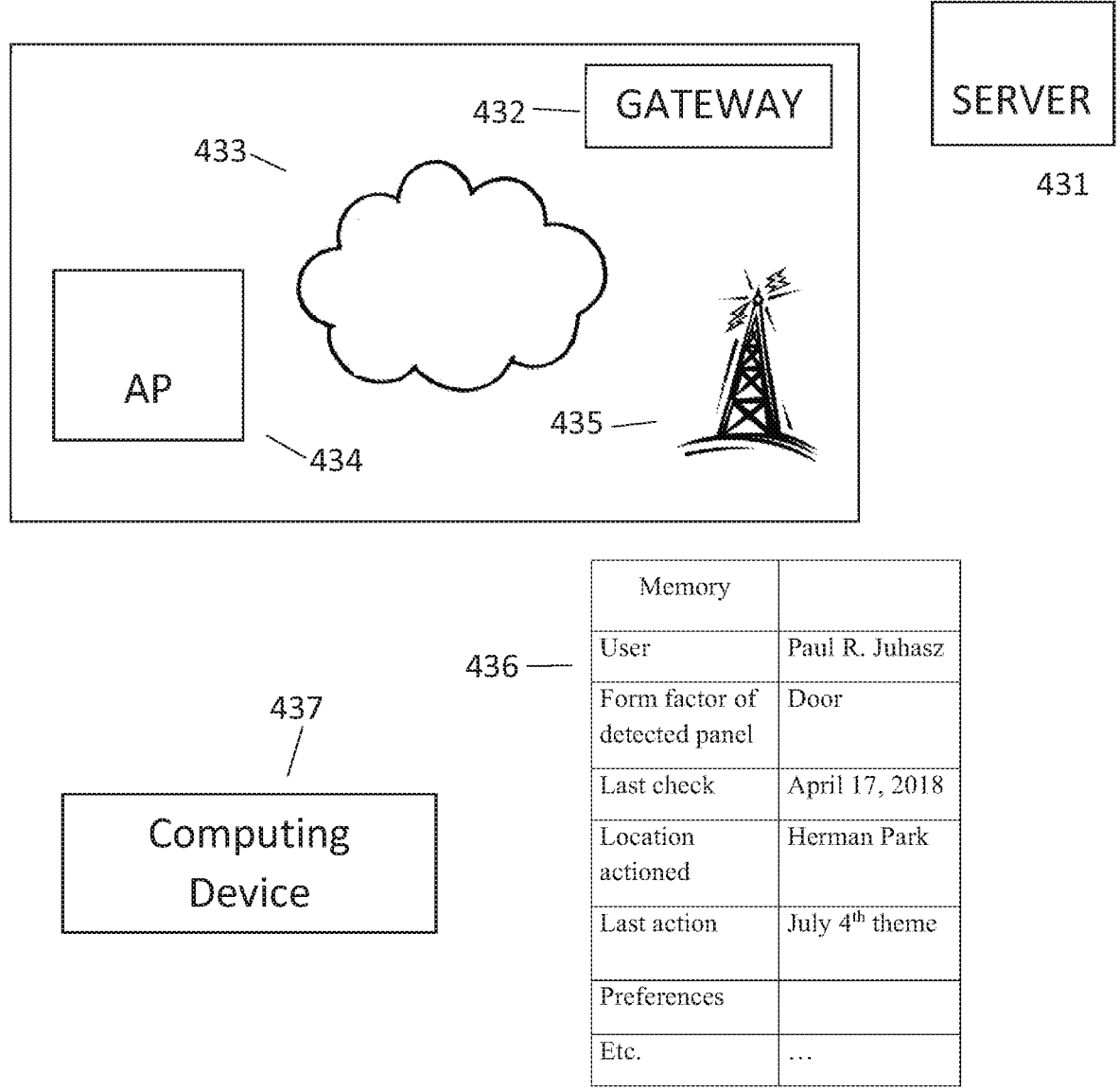

In another embodiment depicted in FIG. 4B, the controller may be a remote computing device such as computing device 437 or server 431 that may recognize and establish electrical communication with communication circuitry associated with an interactive skin of a vehicle panel as explained below. For example, computing device 437 in a restaurant, a store, a hotel, an office, a business establishment, a home, a building, or in any location, inside or outside, may establish an electrical communication with the panel with interactive skin through the communication circuitry associated with the interactive skin.

Alternatively, server 431 may do the same, a communication link in that case may go through an access point 434 and across Internet 433. Communication may go through a base station 435 and over a cellular network if either server 431 or communication circuitry associated with an interactive skin are configured in that way. Communication from server 431 may go through computing device 437, which may be a personal computer, a mobile terminal like a smart phone or other computer device. Alternatively, server 431 may communicate with communication circuitry associated with an interactive skin of a wearable through an Ethernet or other network connection.

In an illustrative embodiment, computing device 437 may be in a restaurant, an office, a home, or outside location and configured to recognize and establish an electrical communication with all panels with interactive skin in that location. The computing device may be configured to cause one or more panels with interactive skin within range to change some configuration. For instance, if the event is a party at a restaurant, the computing device may change the configuration of one or more detected panels with interactive skin to a color or pattern of colors for a theme for the party. As another example, when a homeowner's vehicle is parked in the driveway, a computing device at home may change the color of a panel with interactive skin of that vehicle to a different color. For instance, the vehicle may be configured to be white during the day and black at night.

In another example, a computing device at an outdoor St. Patrick's Day gathering may configure one or all of the panels of vehicles with interactive skin detected by the computing device to display green so that all the configured panels show green. The panels with interactive skin may be configured with any color, audible sound, image, video, text and in other ways according to this disclosure.

In an illustrative embodiment, a computing device in a store, such as a grocery, department, or supply goods store, may detect a panel with an interactive skin and communicate with the person associated with that panel through the interactive skin. For instance, where, for example, the interactive skin is on an interior panel of a vehicle, the computing device may communicate with the person associated with the panel by displaying information on the interactive skin about items that may be of interest to the person.

The person associated with the panel may also communicate with computing device 437 and server 431. For instance, a person may touch a button (like a virtual button as disclosed herein) on the interactive skin to cause the interactive skin to display a window configured to receive information entered by the person and the interactive skin configured to communicate the entered information to the computing device or server or both.

For instance, an application provided by an establishment, like a store or restaurant, and downloaded and executed by control circuitry 580 as explained in this disclosure may be opened up by user touches of the interactive skin and virtual buttons, for instance. Touches of these or other buttons associated with the interactive skin may be used to bring up a window for entering user information. A user may enter the information into the window and send the information to the computing device 437 or server 431 or both. Alternatively, memory associated with the control circuitry 480 may store a cellular phone number of the store or restaurant which the user may text message using the virtual buttons, for example, on the interactive skin. In this case the communication circuitry associated with the panel with interactive skin may be configured for cellular communication as explained in this disclosure. In these and other ways, a user of a panel with interactive skin may interact with a computing device or server at any location.

In another illustrative example, the person associated with the panel with interactive skin may program the panel with interactive skin with preferences of the user. For example, if a user prefers eating at a Thai food restaurant, the panel with interactive skin may be programmed with that preference. In this illustrative example, on detection of the person with this panel with interactive skin by a computing device at a Thai food restaurant, the computing device may send to the person through the interactive skin information, such as that the Thai restaurant is nearby.

Figure 8:
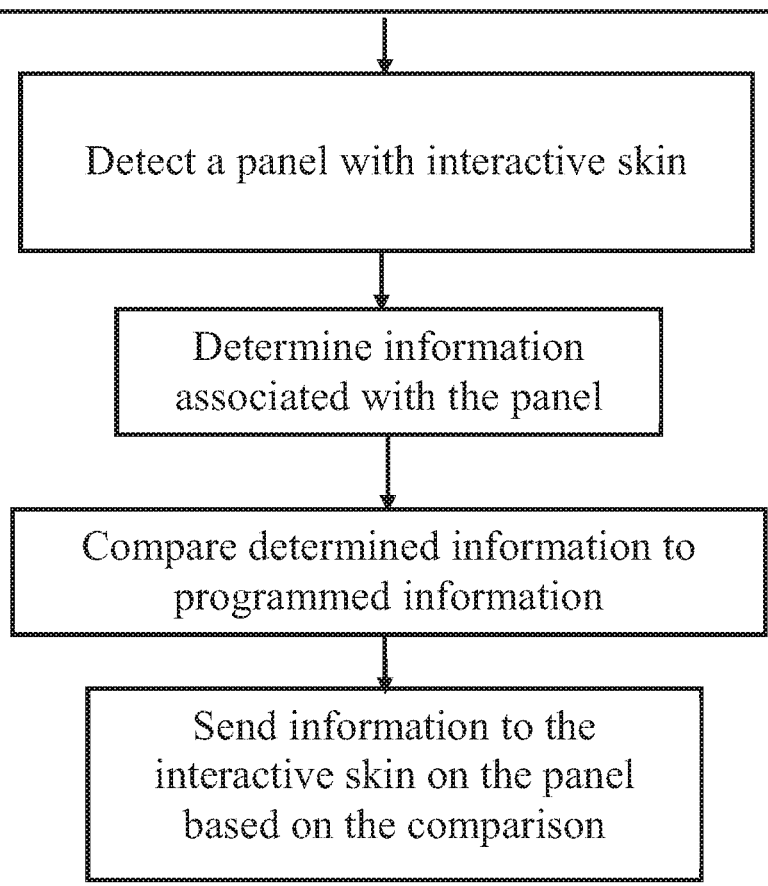
FIG. 8 depicts an illustrative method for configuring a wearable with interactive skin by remote computer

In one illustrative method depicted in FIG. 8, (a) a memory associated with a panel with interactive skin is programmed with information about the panel such as the identity of the purchaser and/or user associated with the panel with interactive skin, the form factor of the panel; the preferences of the person or persons associated with the panel; the make, model of the panel, date of purchase, owner of the panel, etc. A panel with interactive skin is detected such as by a computing device. (b) The information associated with the panel with interactive skin is compared such as by a computing device, (c) information on the panel with interactive skin is determined such as by a computing device. (d) The determined information is compared to the programmed information such as by a computing device, (d) information is sent to the interactive skin on the panel based on the comparison. The information on the user on the memory associated with the computing device may include buying history information on the user buying history, user preferences, store visits, demographics, previously stored user preferences, time spent at a particular section of a store, and so on.

In another illustrative embodiment, information on in memory associated with a panel with an interactive skin may be accessed by authorities for law enforcement, legal, or other purposes. For instance, if a panel with interactive skin is stolen, a remote computer in communication with the panel with interactive skin may track the panel through GPS sensors, location tracking, and other ways to find the panel with interactive skin and the thief and/or a person apprehended with the vehicle.

Turning back to FIG. 4A, the communication link between controller and the interactive skin may be created by wire, wireless, or by optical communication. In wireless and optical embodiments, the interactive skin may be provided with communication circuitry such as wireless communication hardware and associated software to communicate wirelessly, such as by WiFi, WAN, blue tooth or other wireless communication technology. This in order to allow a controller to control the interactive skin.

Control circuitry 480 may illustratively include memory storage. Examples of storage include flash memory, hard disk drive memory, and solid state storage devices. It also includes other nonvolatile memory, random-access memory and other volatile memory, and so on. Control circuitry 480 may also include processing circuitry. The processing circuitry of control circuitry 480 may include microprocessors, digital signal processors, microcontrollers, application specific integrated circuits. It may also include power management unit (PMU) circuits, and processing circuitry that is part of other types of integrated circuits.

Control circuitry 480 controls and may be preprogrammed with instructions stored in a memory for execution by a processor in controlling the interactive skin, such as what content is displayed on the interactive skin. The control circuit also enables the interactive display to be controlled by a user. Illustratively, control is by user interaction with the interactive skin.

In one embodiment, the display rendered on interactive skin as previously explained provides a user interface for controlling the interactive skin. But as previously explained, interactive skin 20 may be controlled from within or without the vehicle, such as by using a programming display 490 inside or outside the vehicle to program the interactive skin. Communication between the controller and the interactive skin may be as previously explained.

Control circuitry 480 may be used to run software such as internet browsing applications and voice-over-internet-protocol (VOIP) telephone call applications. The control circuity may be used to run software such as email applications, media playback applications, operating system functions, and so on.

Control circuitry 480 may be used to configure and operate display pixels and touch sensitive elements associated with touch-sensitive interactive skin 20. For example, control circuitry 480 may be used to illuminate or inactivate portions of interactive skin 20 to create active and inactive regions. As another example, control circuitry 480 may be used to change the operating mode of the interactive skin and/or the functional mode of interactive skin 20 based on, for example, touch-input to touch-sensitive interactive skin 20 or other user input. For example, when a user touches a virtual button on either the interactive skin 20 or on programming display 490, control circuitry 480 may take appropriate action. For example, contact between a user finger or other external object and a virtual button may direct the interactive skin 20 to take actions such as displaying information for a user. It may make a volume adjustment to media that is being played to the user. It may control media playback. It may take an action associated with a wireless communications session. Alternatively, it may take other suitable action.

One or more virtual buttons such as virtual button on the interactive skin 20 may be used to form volume adjustment switches such as sliding controls. It may form ringer s, on/off s, sleep buttons. It may also form customized buttons which may be specific to a particular program or operating system and that may change in real time during use of interactive skin 20. In another embodiment, virtual buttons may be labeled such as with particular colors, patterns, icons, text, or other information. This may assist a user in identifying the function of the button.

Touch-sensitive interactive skin 20 may have regions blocked from view using masking structures. For instance, portions of the panel may block regions from view, such as portion 225 in FIG. 2A. Alternatively, a patterned opaque masking layer may be used. Regions may also be formed by inactive pixels. Control circuitry 480 may be used to configure touch-sensitive interactive skin to have regions with inactive pixels. As shown in FIG. 4, regions may be controlled, by electrical signals applied by control circuitry to conductive traces 422.

Conductive traces 422 may be electrically coupled to control circuitry 480. Conductive traces may be control lines for display pixels in regions. Interactive skin 20 may have additional control circuitry such as control lines, drive lines, and so on along a peripheral edge of interactive skin 20. Providing interactive skin 20 with control circuitry in regions may reduce the area required for control circuitry on the peripheral edge of interactive skin 20. Providing interactive skin 20 with control circuitry in regions may also allow for multiple displays. Control circuitry may also control a plurality of interactive skins within or outside the vehicle. They may be coupled to control circuitry 480 using a common interconnect. Connecting multiple displays to control circuitry 480 using a common interconnect may help reduce the space required for interconnects.

As shown in FIG. 4, side surface display portions 424 may include illuminated touch-sensitive regions 426. Control circuitry 20 may be used to configure touch sensitive interactive skin 20 to illuminate pixels in illuminated touch-sensitive regions 426 and to turn off, or make inactive, remaining pixels in side display portions 424. Illuminating pixels in illuminated touch-sensitive regions 426 and making inactive other pixels in side display portions 424 may separate center surface display portion 422 from illuminated touch-sensitive regions 426.

Illuminated touch-sensitive regions 426 may be configured to remain stationary in side surface display portions 424 or may be repositioned in side surface display portions 424 during normal use of interactive skin panel 20 using control circuitry 480. If desired, illuminated touch sensitive regions 426 may occupy all or substantially all of side surface display portions 424. Virtual buttons 426 may be reconfigured during use of interactive skin 420. For example, interactive skin 420 may use side region 424 to display a first set of buttons when operated in one mode and may use region 424 to display a second set of buttons which may be different when operated in another mode.

A touch-sensitive region 424 may be used to form one or more selection buttons for selecting a software application to be run on interactive skin 20 using control circuitry 420. Selection buttons may include illuminated icons associate with selected software applications. The software applications may include text messaging, calendar, camera, and calculator. They may include media player, web browser, email client, cellular telephone, or other software applications. A selected software application may be activated using a touch input to a portion of illuminated touch-sensitive region 426 associated with a selected selection button. Alternatively it may be activated by touching a region on programming display 490 of control circuitry 480 or by a manual keyboard entry mechanism. For instance, selecting a camera application button on interactive skin may cause selection buttons on illuminated touch-sensitive region 426 on interactive skin to be replaced by function buttons associated with the selected application. Alternatively, selecting a camera application button on programming display 490 of control circuitry 480 may do the same.

Illuminated touch-sensitive region 422 may display a list associated with a media player software application on interactive skin 20. In one example, illuminated touch-sensitive region 422 may display a scrollable list of song titles. Swiping edge region 424, or other region, of interactive skin in one direction may cause the illuminated touch-sensitive region 422 of interactive skin 20 to display song titles. Swiping edge region 424 or other region, of interactive skin 20 in a different direction may cause interactive skin 20 to display a different list associated with the same software application. For example, artist lists, album lists, and playlist lists. As further examples, video lists, genre lists, webcast lists, audio book lists, and so on.

In one embodiment, interactive skin 20 may be received in a recess defined inside the panel of the vehicle. The interactive skin may be hermetically sealed by a transparent layer. The transparent layer may extend across the recess or illustratively across the entire panel. As previously explained, an opening may be provided for an audio or other output. The opening may be overlaid with output functionality friendly material. For example, for an audio output, the material may be of the kind used for outdoor speaker to keep water from ruining speakers.

The interactive skin of this disclosure may be assembled using conventional processes. For example, where interactive skin is configured using flex technology, the assembly may be in accordance with conventional flex technology processing. The interactive skins may be integrated into the external panel of the vehicle in the form factor of door 5 by overlay or receipt within a portion of the external panel of the vehicle in the form factor of door 5 during the assembly of the external panel of the vehicle in the form factor of door 5 and the assembly of that panel to the vehicle.

Figure 5A:
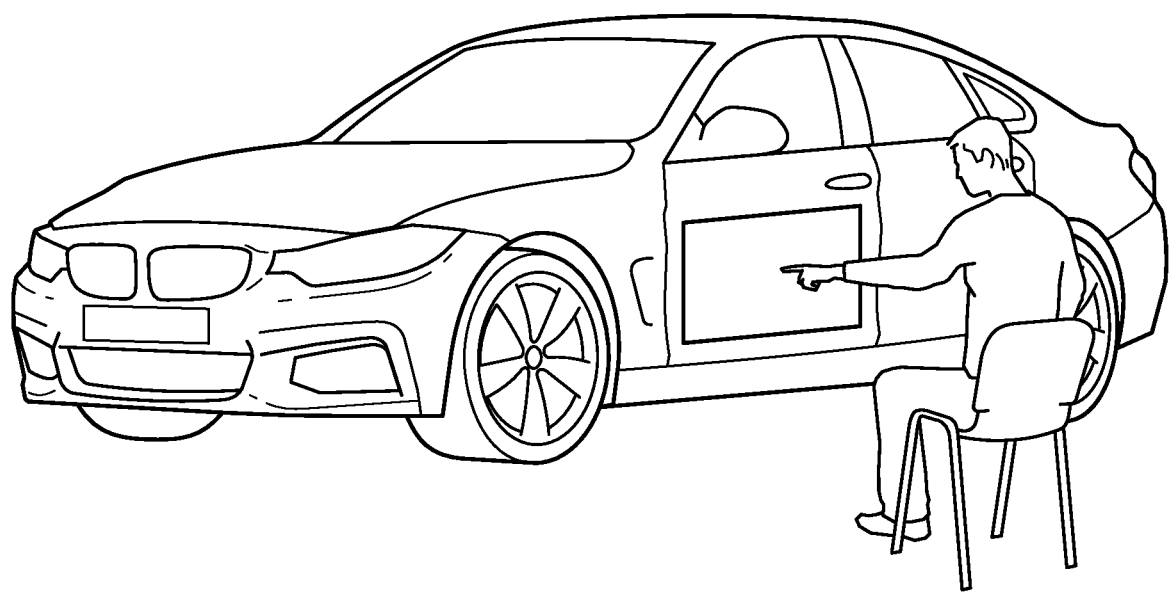
FIGS. 5A and 5B depict some illustrative uses of a vehicle panel with interactive skin in accordance with an embodiment of the present disclosure.
Figure 5B:
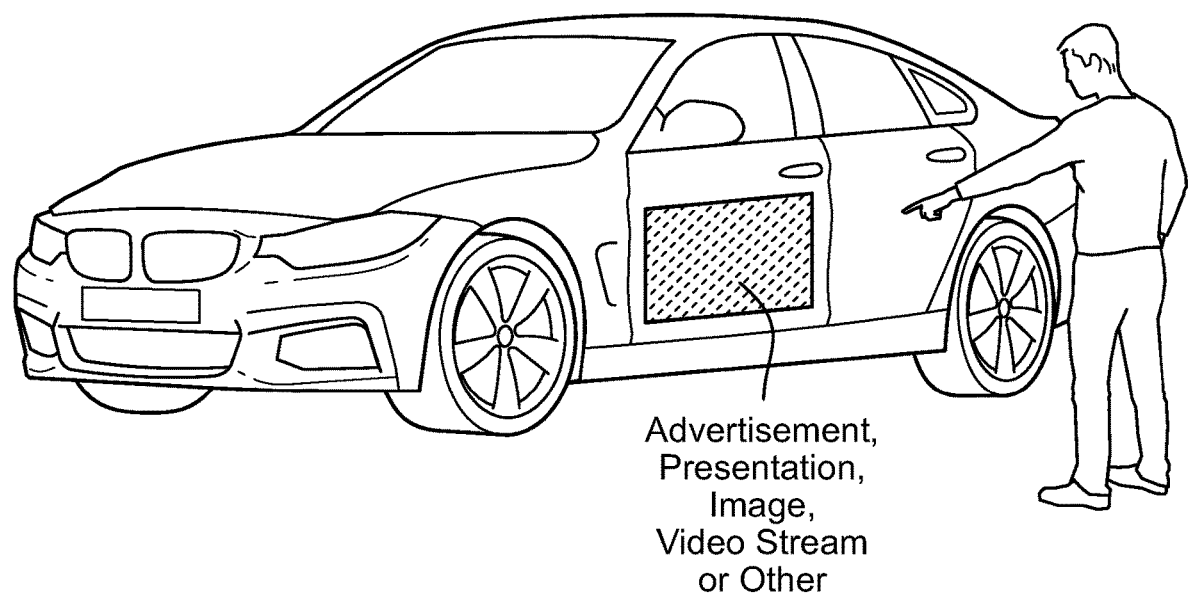

The interactive skin of this disclosure has many uses. FIG. 5 depicts a user interacting with the interactive skin adapted to the external panel of the vehicle in the form factor of door 5. In FIG. 5A the user is employing the interactive skin in a vehicle system for infotainment and connectivity purposes. A user may use the interactive skin 75, 83, 80, or 88 in FIGS. 1E, 1F, and 1G in the same way within the vehicle. In FIG. 5B a user has employed the interactive skin in his vehicle system for information broadcast purposes. In the figure, the illustrative skin is configured to broadcast advertisement, a presentation, an image, a video stream and other information. The interactive skins may be configured to display one or more colors, texts, designs, pictures, videos, or to broadcast one or more sounds, music, or a combination of one or more of these functionalities.

One or more interactive skins may be used to configure the appearance of the vehicle. For example, a predetermined number of interactive skins may be programmed to have a predetermined color on one day and a different predetermined color on another day. Thus, the vehicle may appear red on one day and blue on a different day. This allows the user of the vehicle to customize his or her vehicle to a mood, occasion, for fun, or for other reasons. A military vehicle may be programmed with a color or scheme of colors to best camouflage the vehicle in military operations. Thus, this disclosure may allow a military vehicle to be configured to be more chameleon-like to better blend into the surroundings which may provide better protection in maneuvers and against enemies.

As another example, a predetermined number of interactive skins may be programmed to have a color scheme to present a theme. For example, the interactive skins may be programmed to have one or more interactive skins each display the American flag in which case the vehicle may display one or a plurality of American flags. In another embodiment, two or more or a cluster of the interactive skins may each display a different portion of the American flag such that when displayed collectively, the interactive skins depict an overall appearance of one American flag. Any one or more interactive skins may be configured to display any color scheme, words or messages, audible sounds, music generation, audio, video and so on. In addition any one or more interactive skins may be programmed to vary its display over time to another color scheme, words or messages, audible sounds, music generation, audio, video and so on. Any one or more interactive skin may be programmed to dynamically vary its display based on conditions such as time, night or day, heat, sunny or cloudy day. For example, one or more interactive skin may be configured to display the color red during the day and the color white at night; the white color being more visible in the night time and so may be more safe. One or more interactive skins may be configured to display the color blue on a sunny day and yellow on a cloudy day to mirror the mood of the driver or a passenger.

Any one or more interactive skin may be programmed to vary the input and output functions that may be possible with the interactive skin of this disclosure at different times. For example, when the vehicle is parked, one or more interactive skin may be configured to activate sensors associated with the interactive skin to provide a security system for the vehicle against intrusion. The sensors may detect a motion such as the opening of a door or breaking of a window or removal of a tire that may alert a person to the intrusion of the vehicle.

The interactive skin of this disclosure may be configured to be password protected so that only the user or those who have been provided the password may activate the touch feature of the interactive skin of this disclosure. In this way, the interactive skin is only touch responsive to someone who knows the password for interacting with the interactive skin. For instance, a touch may cause the interactive skin to display a keyboard for entry by a user of the password. On proper entry of the password, the interactive skin may allow further interaction by the user with the interactive skin.

Some functionality of the interactive skin of this disclosure has been previously described by illustrative examples which is not limiting. Other applications of the interactive skin of this disclosure are also covered by this disclosure. By way of further example, FIG. 6 depicts a set of functions that may be provided to the interactive skin of this disclosure. This functionality includes an audio plug receptacle 1110, a connector receptacle 2000, one or more user input components 1120, one or more output components 1160, control circuitry 1130, graphics circuitry 1170, a bus 1115, a memory 1140, a storage device 1180, communications circuitry 1150 and POM (position, orientation or movement sensor) or other sensors 1190. Other sensors may also be used as explained below.

Control circuitry 1130 has been previously explained and may be dedicated to an interactive skin of this disclosure or to a plurality of interactive skins of this disclosure. The control circuitry may be the control circuitry that controls the vehicle systems. The control circuitry may be a control system associated with a smart phone or other wireless device. The control circuitry may be a control circuitry associated with a computer device. Other control circuitry may be useable with the interactive skin of this disclosure.

Memory 1140 has been previously described and may reside in proximity or removed from the interactive skin of this disclosure. Input component and output component may provide a user with enhanced ability to interact with panel. For example, input component 1120 and output component 1160 may provide an interface for a user to interact with an application running on control circuitry. Input component may take a variety of forms, such as a keyboard/keypad, trackpad, mouse, click wheel, button, stylus or touch screen. Input component may also include one or more devices for user authentication (e.g., smart card reader, fingerprint reader or iris scanner) as well as an audio input device (e.g., a microphone) or a video input device (e.g., a camera or a web cam) for recording video or still frames. Output components may include any suitable display, such as a liquid crystal display (LCD) or a touch screen display, a projection device, a speaker or any other suitable system for presenting information or media to a user. Output component 1160 may be controlled by graphics circuitry. Graphics circuitry 1170 may include a video card, such as a video card with 2D, 3D or vector graphics capabilities. In some embodiments, output component may also include an audio component that is remotely coupled to panel. For example, output component may include a headset, headphones or ear buds. These may be coupled to panel with a wire or wirelessly, such as by Bluetooth headphones or a Bluetooth headset, or optically.

There may be one or more applications such as software applications stored on storage device or in memory. Control circuitry may be configured to execute instructions of the applications from memory. For example, control circuitry may be configured to execute a media player application that causes full-motion video or audio to be presented or displayed on interactive skin or an output component. Other applications may illustratively include a telephony application, a GPS navigator application, a web browser application, a calendar or organizer application. Interactive skin may also execute any suitable operating system, such as a Mac OS, Apple iOS, Linux or Windows. The system may include a set of applications stored on storage device or memory that is compatible with the particular operating system.

In some embodiments, the interactive skin of this disclosure is provided with or coupled to communications circuitry to connect to one or more communications networks. Communications circuitry 1150 may be any suitable communications circuitry operative to connect to a communications network and to transmit communications (e.g., voice or data) from interactive skin or panel coupled to interactive skin to other devices within the communications network. Communications circuitry may be operative to interface with the communications network. The communications circuitry may do so using any suitable communications protocol such as, Wi-Fi (such as., a 802.11 protocol), Bluetooth, high frequency systems (such as, 900 MHz, 2.4 GHz and 5.6 GHz communication systems), infrared, GSM, GSM plus EDGE, CDMA, quad band and other cellular protocols, VOIP or any other suitable protocol.

Communications circuitry may be operative to create a communications network using any suitable communications protocol. Communications circuitry may create a short-range communications network to connect to other devices using a short-range communications protocol. For instance, communications circuitry may be operative to create a local communications network using the Bluetooth protocol to couple to a Bluetooth headset or other Bluetooth device. Communications circuitry may include a wired or wireless network interface card (NIC) configured to connect to the Internet or any other public or private network. For instance, interactive skin may be configured to connect to the Internet via a wireless network. The network may be packet radio network, an RF network, a cellular network or any other suitable type of network. Communication circuitry may initiate and conduct communications with other communications devices or media devices within a communications network.

The interactive skin of this disclosure may be provided with or coupled to other components suitable for performing a communications operation. For instance, the interactive skin may include or have associated with it a power supply. The power supply may be a battery, a lithium battery, a solar battery, and so on. The power supply may be provided by other sources, such as supplied by a computing device, such as a smartphone, associated with the interactive skin.

As other examples, the interactive skin may include or have associated with it an antenna, ports or interfaces for coupling to a host device, a secondary input mechanism such as an ON/OFF switch or any other suitable component.

The interactive skin of this disclosure may be provided with or coupled to POM or other sensors. These sensors may be used to determine the approximate geographical or physical location of interactive skin. This may allow the location of an interactive skin or its associated panel or other panels in communication therewith to be derived from any suitable trilateration or triangulation technique. In this illustrative example, POM sensors may include an RF triangulation detector or sensor or any other location circuitry configured to determine the location of interactive skin and/or its associated panels.

POM sensors 1190 provided with or coupled to interactive skin may also include one or more sensors or circuitry for detecting the position orientation or movement of interactive skin or a panel or panels associated with interactive skin. Such sensors and circuitry may illustratively include single-axis or multi-axis accelerometers, angular rate or inertial sensors (such as, optical gyroscopes, vibrating gyroscopes, gas rate gyroscopes or ring gyroscopes), magnetometers (such as, scalar or vector magnetometers), ambient light sensors, proximity sensors, motion sensor (such as, a passive infrared (PIR) sensor, active ultrasonic sensor or active microwave sensor) and linear velocity sensors. For instance, control circuitry may be configured to read data from one or more of POM sensors in order to determine the location orientation or velocity of an interactive skin or panel or panels associated therewith. One or more of POM sensors may be positioned above, below or on either side of the display presented by the interactive skin of this disclosure. The sensor may also be positioned near an output component such as a speaker.

Control circuit 1130 may be powered by a power source of the vehicle. In an embodiment wherein the control circuity is provided by a computing device such as a smart phone, mobile computing or other computing device, the power source of the device may power the control circuitry . . . . The interactive skin of this disclosure may be provided with its own dedicated power source sized to meet the power requirements demanded by the functionality provided by the interactive skin.

Software may be used to manage power consumption by the interactive skin. For example, power to the interactive skin may be throttled based on power source requirements. For instance, when available power falls below predetermined levels, power to the interactive skin may be turned entirely off or functionality provided by the interactive skin may be throttled back.

The interactive skin may be provided with varying combinations of the foregoing electronic components. For example, an interactive skin may be provided with a GPS sensor and a controller and communication circuitry to allow the whereabouts of the interactive skin or panel associated therewith to be tracked. This may allow panels to be recovered such as those that are stolen. As another example, an interactive display may include an audio jack. Any combination of components to configure the interactive skin with the desired smarts may be used to achieve the desired functionality.

Additionally, the panel may include other electronic functionality, such as a loudspeaker 1194 or microphone 1192 to enable a user to interact with the interactive skin in this way.

As explained in this disclosure, the interactive skin may take any shape and form and may overlay or be received within or form an integrated part of substantially all or all of internal or external portion of a panel of a vehicle.

Figure 7A:
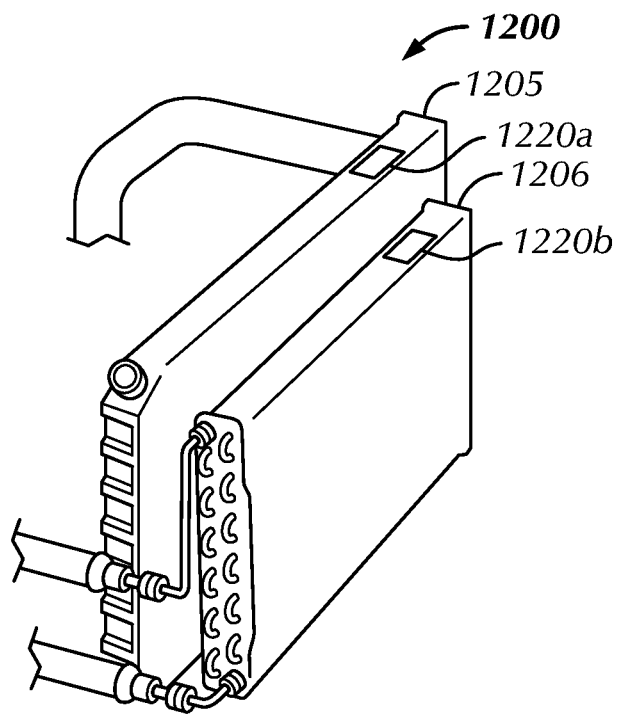
FIGS. 7A and 7B depict some illustrative uses of interactive skin in detecting a condition of a panel accordance with this disclosure.
Figure 7B:
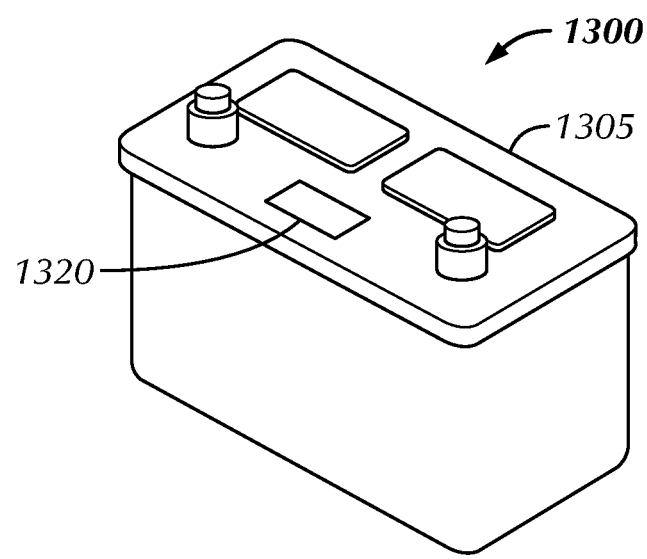

FIG. 7 depicts some other illustrative uses of a vehicle panel with interactive skin in accordance with this disclosure. FIG. 7A depicts interactive skin 1220a on a radiator 1205 and skin 1120b on a condenser 1206 of a car. In FIG. 7b, interactive skin 1320 is on battery 1305. Each of interactive skin 1220a, 1220b, and 1320 is configured for detecting a condition of radiator 1205, condenser 1306 and battery 1305, respectively. The technology adapted to the interactive skin for detecting the condition may be a sensor. For example, one or more interactive skin may be configured with a sensor. The sensor may be a smart sensor that may be configured to generate a change in state upon detection of a predetermined temperature. For example, if the temperature rises above a predetermined temperature, the interactive skin may generate an alert, thereby indicating to the user that there is an over-heating condition. The alert may cause the color of the interactive skin to change. Illustratively, the change may occur by display of a different color by the interactive skin on occurrence of such condition. In an alternative example the interactive skin may be provided with a layer of temperature sensitive material that is configured to change color on occurrence of the condition.

The condition detected by the sensor used in connection with the interactive skin of this disclosure may be selected from the group consisting of temperature, pressure, current, voltage, incorrect electrical connection, incorrect mechanical connection, mechanical shock, mechanical stress, aging, corrosion, rusting, oxidizing, electrical circuit design. The response of the interactive skin to a condition detected by the sensor may be selected from the group consisting of audible alert, visual alert, or combination thereof. Responsive to a detected condition, the interactive skin of this disclosure may provide an audible alert or present a display indicating the detected condition. The interactive skin may be configured to be touch sensitive as previously described to allow user to interact with the interactive skin. For instance, on touch the interactive skin may provide the current condition of the panel with which the interactive skin is associated. Further user interaction may cause the interactive display to display historical information on the panel or provide other information. The user may interact with the interactive display in accordance with the teachings of this disclosure to learn more about the condition of the panel with which the interactive skin is associated.

Responsive to the detected condition, the interactive skin may communicate the condition to an electronic component and thereby provides a notification service. In one example, the interactive skin may communicate the condition to the dashboard of vehicle or a smart phone. The interactive skin may communicate information about the detected condition such as the existence of the condition, severity of condition, time remaining before failure, remedial steps that may be taken, and so on.

While FIG. 7 depicts the interactive skin of this disclosure applied to a radiator, a condenser, and a battery of a vehicle, the interactive skin may be applied to any body part of a vehicle. For example, the engine of a vehicle may be provided with an interactive skin instrumented to detect a condition of the engine such as temperature of the housing or oil temperature or drop in oil pressure. The suspension system of a car may be provided with an interactive skin instrumented to detect pulling in one direction. An interactive skin on a tire may be instrumented to detect tire pressure. An interactive skin on a brake may be instrumented to detect low brake fluid pressure or pad thickness. As previously explained, an interactive skin may be associated with one or more panels or parts of a vehicle to provide interaction between the panel or part and a user.

There is thus described a panel for a vehicle including an interactive skin configured for accepting touch input from a user. The touch input from a user may render a display for user input and output functions.

The interactive skin may include a flexible display layer, a touch sensitive layer, and a transparent display cover layer. Thee flexible display layer may include image pixels. The touch sensitive layer may include at least one capacitive touch electrodes.

The touch sensitive layer may include a plurality of capacitive touch electrodes configured to detect the location of one or more touches or near touches on touch sensitive layer. The interactive skin may be configured for control by a control circuitry that selectively activates and inactivates the display pixels.

The user input and output functions may be configured for performing a function selected from the group consisting of: voice communication; data communication; sending emails; sending text messages; sending messages via applications; using GPS; enabling installation of programs; enabling running of programs; enabling calendars; enabling calculator; enabling an interface for data entry; enabling management of digital data and contacts; enabling displaying documents in at least one format; enabling word processing, spreadsheets, and document viewing; enabling internet access; enabling camera functionality; enabling capture of still images or video; enabling sending of still images or video; enabling making, editing, and storing videos and photos; enabling mp3 player; enabling running of mp3 player; enabling video game applications; enabling; enabling near field communication; audio information input; audio information output; text information input; text information output; image information input; image information output; video information input; video information output, or a combination thereof.

The interactive skin may include an active portion and an inactive portion, the active portion providing user input and output functions. The touch input from a user may create at least one virtual user interface element for controlling user input operations. The virtual user interface control may be a button.

The interactive skin may be configured to operate in at least one mode of operation. The interactive skin may be configured to also operate in at least a second mode of operation and wherein the user interface element is repurposed for controlling user input operations when the interactive skin is operating in the second mode of operation. The function of changing between the at least a first mode of operation and the at least a second operating mode of operation of the interactive skin may be selected from the group consisting of tapping, sliding, swiping, or other gesture motion of the user touch of the interactive skin.

The vehicle may be selected from the group consisting of a car, a bus, a truck, a plane, a train, a motorcycle, a bicycle, a motor or sail or other boat, a ski or snowboard, and any other mode of transportation.

A panel for a vehicle may include an interactive skin configured for detecting a condition of at least one panel and generating an output function in response to the detected condition. The condition may be detected by a sensor. The sensor may generate an output upon a condition selected from the group consisting of temperature, pressure, current, voltage, incorrect electrical connection, incorrect mechanical connection, mechanical shock, mechanical stress, aging, corrosion, rusting, oxidizing, electrical circuit design. The response to detected condition may be selected from the group consisting of audible alert, visual alert, or combination thereof. The response to detected condition may be rendering of a display of the detected condition on the interactive skin. The output function may be a notification service.

The interactive skin may overlay the panel. The interactive skin may be recessed into the panel. The interactive skin may contour the shape of the panel.

The foregoing is merely illustrative of the principles of this invention and various modifications can be made by those skilled in the art without departing from the scope and spirit of the invention.

Various other components may be included and called upon for providing for aspects of the teachings herein. For example, additional materials, combinations of materials, and/or omission of materials may be used to provide for added embodiments that are within the scope of the teachings herein.

While the disclosure has been described with reference to illustrative embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. In an external panel of a vehicle:
a material that forms a vehicle panel;
display pixels included in the material;
wherein the vehicle panel includes an outside surface;
wherein the outside surface of the vehicle panel defines a first section along a first physical portion of the outside surface of the vehicle panel;
wherein the outside surface of the vehicle panel defines a second section along a second physical portion of the outside surface of the vehicle panel;
wherein the outside surface of the vehicle panel defines a third section along a third physical portion of the outside surface of the vehicle panel, the third section lying between the first section and the second section of the vehicle panel;
wherein the display pixels in the material are arranged along the first section and along the second section of the vehicle panel;
wherein the third section of the vehicle panel does not include display pixels;
wherein the display pixels are arranged along the first section and along the second section of the vehicle panel configurable to provide a display, the display being viewable from outside the vehicle panel; and
wherein the vehicle is a car.

2. In the external panel of a vehicle of claim 1, wherein the display pixels form the surface of the vehicle panel along the first and second sections of the vehicle panel.

3. In the external panel of a vehicle of claim 1, wherein the display pixels along the first section of the vehicle panel form a display layer.

4. In the external panel of a vehicle of claim 3 further comprising a touch sensitive layer, the touch sensitive layer overlaying the display layer, the touch sensitive layer configured to detect the location of one or more touches or near touches on the touch sensitive layer; and wherein the touch input from a user renders a display on the display pixels for user input and output functions.

5. The external panel of claim 4 wherein the user input and output functions are configured for performing a function selected from the group consisting of: voice communication; data communication; sending/receiving emails; sending/receiving text messages; sending/receiving messages via applications; input/output use of GPS; enabling installation of programs; enabling running of programs; enabling calendars; enabling calculator; enabling an interface for data entry; enabling management of digital data and contacts; enabling displaying documents in at least one format; enabling word processing, spreadsheets, and document viewing; enabling internet access; enabling camera functionality; enabling capture of still images or video; enabling sending of still images or video; enabling making, editing, and storing videos and photos; enabling mp3 player; enabling running of mp3 player; enabling video game applications; enabling; enabling near field communication; audio information input; audio information output; text information input; text information output; image information input; image information output; video information input; video information output, and any combination thereof.

6. In the external panel of a vehicle of claim 1, wherein the display pixels along the first and second sections of the display panel form a display layer, the display layer further extends below the outside surface of the vehicle panel along the third section of the vehicle panel.

7. In the external panel of a vehicle of claim 6 further comprising a touch sensitive layer, the touch sensitive layer overlaying the display layer, the touch sensitive layer configured to detect the location of one or more touches or near touches on the touch sensitive layer; and wherein the touch input from a user renders a display on the display pixels for user input and output functions.

8. In the external panel of a vehicle of claim 1, wherein the display pixels along the first and second sections of the display panel form a display layer, the display layer further bends below the outside surface of the vehicle panel along the third section of the vehicle panel.

9. In the external panel of a vehicle of claim 8 further comprising a touch sensitive layer, the touch sensitive layer overlaying the display layer, the touch sensitive layer configured to detect the location of one or more touches or near touches on the touch sensitive layer; and wherein the touch input from a user renders a display on the display pixels for user input and output functions.

10. The external panel for a vehicle of claim 1 wherein the vehicle panel is selected from the group consisting of: a door, a full rear fender panel, a door bottom, a full front fender panel, a rear fender panel, a lower front section of rear fender, a floor pan, a rear section of front fender, a front section of front fender, a wheel arch or center section of rear fender, a dogleg panel, a rocker panel, an inner headlight panel, a headlight cap header and nose panels, hoods, tailgates trunk lids, tail lights, and step bumpers.

11. In the external panel of a vehicle of claim 1, wherein the vehicle panel is configured for detecting a condition and generating an output function in response to the detected condition.

12. In the external panel of a vehicle of claim 11 wherein the condition is detected by a sensor.

13. The external panel of claim 12 wherein the sensor generates an output upon detecting a condition selected from the group consisting of a predetermined temperature, a predetermined pressure, a predetermined current, a predetermined voltage, a predetermined incorrect electrical connection, a predetermined incorrect mechanical connection, a predetermined amount of mechanical shock, a predetermined amount of mechanical stress, a predetermined amount of aging of a part, a predetermined amount of corrosion of a part, a predetermined amount of rusting of a part, a predetermined amount of oxidizing of a part, and a predetermined signal from an electrical circuit.

14. The external panel of claim 13 wherein the output to the detected condition is an output selected from the group consisting of audible alert, visual alert, and a combination thereof.

15. An external panel for a vehicle, the vehicle panel comprising:
material;
display pixels;
an outside surface;
wherein the outside surface of the vehicle panel defines a first section along a first physical portion of the outside surface of the vehicle panel;
wherein the physical outside surface of the vehicle panel defines a second section along a second physical portion of the outside surface of the vehicle panel;
wherein the physical outside surface of the vehicle panel defines a third section along a third physical portion of the outside surface of the vehicle panel, the third section lying between the first section and the second section of the vehicle panel;
wherein the display pixels are arranged along the first section and along the second section of the vehicle panel;
wherein the third section of the vehicle panel does not include display pixels;
wherein the display pixels are arranged along the first section and along the second section of the vehicle panel configurable to provide a display, the display being viewable from outside the vehicle panel.

16. The external vehicle panel of claim 15, wherein the display pixels form the surface of the vehicle panel along the first and second sections of the vehicle panel.

17. The external vehicle panel of claim 15, wherein the display pixels along the first section of the vehicle panel form a display layer.

18. The external vehicle panel of claim 17 further comprising a touch sensitive layer, the touch sensitive layer overlaying the display layer, the touch sensitive layer configured to detect the location of one or more touches or near touches on the touch sensitive layer; and wherein the touch input from a user renders a display on the display pixels for user input and output functions.

19. The external panel of claim 18 wherein the user input and output functions are configured for performing a function selected from the group consisting of: voice communication; data communication; sending/receiving emails; sending/receiving text messages; sending/receiving messages via applications; input/output use of GPS; enabling installation of programs; enabling running of programs; enabling calendars; enabling calculator; enabling an interface for data entry; enabling management of digital data and contacts; enabling displaying documents in at least one format; enabling word processing, spreadsheets, and document viewing; enabling internet access; enabling camera functionality; enabling capture of still images or video; enabling sending of still images or video; enabling making, editing, and storing videos and photos; enabling mp3 player; enabling running of mp3 player; enabling video game applications; enabling; enabling near field communication; audio information input; audio information output; text information input; text information output; image information input; image information output; video information input; video information output, and any combination thereof.

20. The external vehicle panel of claim 15, wherein the display pixels along the first and second sections of the display panel form a display layer, the display layer further extends below the outside surface of the vehicle panel along the third section of the vehicle panel.

21. The external vehicle panel of claim 20 further comprising a touch sensitive layer, the touch sensitive layer overlaying the display layer, the touch sensitive layer configured to detect the location of one or more touches or near touches on the touch sensitive layer; and wherein the touch input from a user renders a display on the display pixels for user input and output functions.

22. The external vehicle panel of claim 15, wherein the display pixels along the first and second sections of the display panel form a display layer, the display layer further bends below the outside surface of the vehicle panel along the third section of the vehicle panel.

23. The external vehicle panel of claim 22 further comprising a touch sensitive layer, the touch sensitive layer overlaying the display layer, the touch sensitive layer configured to detect the location of one or more touches or near touches on the touch sensitive layer; and wherein the touch input from a user renders a display on the display pixels for user input and output functions.

24. The external panel for a vehicle of claim 15 wherein the vehicle is a car and the vehicle panel is selected from the group consisting of: a door, a full rear fender panel, a door bottom, a full front fender panel, a rear fender panel, a lower front section of rear fender, a floor pan, a rear section of front fender, a front section of front fender, a wheel arch or center section of rear fender, a dogleg panel, a rocker panel, an inner headlight panel, a headlight cap header and nose panels, hoods, tailgates trunk lids, tail lights, and step bumpers.

25. In the external panel of a vehicle of claim 15, wherein the vehicle panel is configured for detecting a condition and generating an output function in response to the detected condition.

26. In the external panel of a vehicle of claim 25 wherein the condition is detected by a sensor.

27. The external panel of claim 26 wherein the sensor generates an output upon detecting a condition selected from the group consisting of a predetermined temperature, a predetermined pressure, a predetermined current, a predetermined voltage, a predetermined incorrect electrical connection, a predetermined incorrect mechanical connection, a predetermined amount of mechanical shock, a predetermined amount of mechanical stress, a predetermined amount of aging of a part, a predetermined amount of corrosion of a part, a predetermined amount of rusting of a part, a predetermined amount of oxidizing of a part, and a predetermined signal from an electrical circuit.

28. The external panel of claim 27 wherein the output to the detected condition is an output selected from the group consisting of audible alert, visual alert, and a combination thereof.

29. In the external panel of a vehicle of claim 15, wherein the vehicle panel is configured for detecting a condition and generating an output function in response to the detected condition.

30. An external panel for a vehicle, the vehicle panel comprising:
material;
display pixels;
an outside surface;
wherein the outside surface of the vehicle panel defines a first section along a first physical portion of the outside surface of the vehicle panel;
wherein the physical outside surface of the vehicle panel defines a second section along a second physical portion of the outside surface of the vehicle panel;
wherein the physical outside surface of the vehicle panel defines a third section along a third physical portion of the outside surface of the vehicle panel, the third section lying between the first section and the second section of the vehicle panel;
wherein the display pixels are arranged along the first section and along the second section of the vehicle panel;
wherein the display pixels along the first and second sections of the display panel form a display layer;
wherein the display layer bends below the outside surface of the vehicle panel along the third section of the vehicle panel; wherein the third section of the vehicle panel does not include display pixels;
wherein the display pixels are arranged along the first section and along the second section of the vehicle panel configurable to provide a display, the display being viewable from outside the vehicle panel.

31. The external vehicle panel of claim 30, wherein the display pixels form the surface of the vehicle panel along the first and second sections of the vehicle panel.

32. The external vehicle panel of claim 30 further comprising a touch sensitive layer, the touch sensitive layer overlaying the display layer, the touch sensitive layer configured to detect the location of one or more touches or near touches on the touch sensitive layer; and wherein the touch input from a user renders a display on the display pixels for user input and output functions.

33. The panel of claim 32 wherein the vehicle is selected from the group consisting of a car, a bus, a truck, a plane, a train, a motorcycle, a bicycle, a motor or sail or other boat, a ski or snowboard, and any other mode of transportation.

34. The external panel of claim 32 wherein the user input and output functions are configured for performing a function selected from the group consisting of: voice communication; data communication; sending/receiving emails; sending/receiving text messages; sending/receiving messages via applications; input/output use of GPS; enabling installation of programs; enabling running of programs; enabling calendars; enabling calculator; enabling an interface for data entry; enabling management of digital data and contacts; enabling displaying documents in at least one format; enabling word processing, spreadsheets, and document viewing; enabling internet access; enabling camera functionality; enabling capture of still images or video; enabling sending of still images or video; enabling making, editing, and storing videos and photos; enabling mp3 player; enabling running of mp3 player; enabling video game applications; enabling; enabling near field communication; audio information input; audio information output; text information input; text information output; image information input; image information output; video information input; video information output, and any combination thereof.

35. The panel of claim 32 wherein the vehicle is selected from the group consisting of a car, a bus, a truck, a plane, a train, a motorcycle, a bicycle, a motor or sail or other boat, a ski or snowboard, and any other mode of transportation.

36. The external panel for a vehicle of claim 30 wherein the vehicle is a car and the vehicle panel is selected from the group consisting of: a door, a full rear fender panel, a door bottom, a full front fender panel, a rear fender panel, a lower front section of rear fender, a floor pan, a rear section of front fender, a front section of front fender, a wheel arch or center section of rear fender, a dogleg panel, a rocker panel, an inner headlight panel, a headlight cap header and nose panels, hoods, tailgates trunk lids, tail lights, and step bumpers.

37. In the external panel of a vehicle of claim 36 wherein the condition is detected by a sensor.

38. The external panel of claim 37 wherein the sensor generates an output upon detecting a condition selected from the group consisting of a predetermined temperature, a predetermined pressure, a predetermined current, a predetermined voltage, a predetermined incorrect electrical connection, a predetermined incorrect mechanical connection, a predetermined amount of mechanical shock, a predetermined amount of mechanical stress, a predetermined amount of aging of a part, a predetermined amount of corrosion of a part, a predetermined amount of rusting of a part, a predetermined amount of oxidizing of a part, and a predetermined signal from an electrical circuit.

39. The external panel of claim 38 wherein the output to the detected condition is an output selected from the group consisting of audible alert, visual alert, and a combination thereof.

\* \* \* \* \*